(12) United States Patent
Goldschlag et al.

(10) Patent No.: US 8,935,384 B2
(45) Date of Patent: Jan. 13, 2015

(54) DISTRIBUTED DATA REVOCATION USING DATA COMMANDS

(75) Inventors: David Goldschlag, Silver Spring, MD (US); Kevin Sapp, Washington, DC (US); David Walker, Leesburg, VA (US)

(73) Assignee: McAfee Inc., Santa Clara, CA (US)

( * ) Notice: Subject to any disclaimer, the term of this patent is extended or adjusted under 35 U.S.C. 154(b) by 76 days.

(21) Appl. No.: 13/102,627

(22) Filed: May 6, 2011

(65) Prior Publication Data

US 2011/0276683 A1    Nov. 10, 2011

Related U.S. Application Data

(60) Provisional application No. 61/332,088, filed on May 6, 2010.

(51) Int. Cl.
  *G06F 15/173* (2006.01)
  *H04W 12/08* (2009.01)
  *H04W 4/00* (2009.01)
  *G06F 15/16* (2006.01)

(52) U.S. Cl.
  CPC .............. *H04W 12/08* (2013.01); *H04W 4/00* (2013.01); *H04W 4/003* (2013.01)
  USPC .......................... 709/224; 709/217; 709/223

(58) Field of Classification Search
  CPC ........ H04W 4/00; H04W 4/003; H04W 12/08
  USPC ................................................. 709/223, 224
  See application file for complete search history.

(56) References Cited

U.S. PATENT DOCUMENTS

| 5,727,202 A | 3/1998 | Kucala |
| 5,884,323 A | 3/1999 | Hawkins et al. |
| 5,987,610 A | 11/1999 | Franczek et al. |
| 6,000,000 A | 12/1999 | Hawkins et al. |
| 6,006,274 A | 12/1999 | Hawkins et al. |

(Continued)

FOREIGN PATENT DOCUMENTS

| AU | 2003260071 | 3/2004 |
| EP | 0661677 | 7/1995 |

(Continued)

OTHER PUBLICATIONS

European Patent Office Communication Pursuant to Article 94(3) EPC (Examination Report) dated Jul. 5, 2013 in EP Application No. 09759830.4.

(Continued)

*Primary Examiner* — Joseph Greene
(74) *Attorney, Agent, or Firm* — Patent Capital Group

(57) ABSTRACT

A policy proxy intercepts a data stream between a data server and a user or other device, identifies the user device, and identifies a policy in an integrated policy server applicable to the user device based on the identity of the user device. The policy proxy may identify one or more of the policy elements based on the user device, and translate the policy elements into actions involving the data stream between the data server and the user device so as to implement at least one aspect of the identified policy. The actions can comprise permitting normal exchange of data between the data server and the user device, preventing communication between the data server and the user device, or modifying the data stream between the data server and the user device.

17 Claims, 9 Drawing Sheets

(56) References Cited

U.S. PATENT DOCUMENTS

| | | | |
|---|---|---|---|
| 6,073,142 A | 6/2000 | Geiger et al. | |
| 6,124,799 A | 9/2000 | Parker | |
| 6,158,010 A | 12/2000 | Moriconi et al. | |
| 6,301,484 B1 | 10/2001 | Rogers et al. | |
| 6,317,868 B1 | 11/2001 | Grimm et al. | |
| 6,360,322 B1 | 3/2002 | Grawrock | |
| 6,460,050 B1 | 10/2002 | Pace et al. | |
| 6,661,780 B2 | 12/2003 | Li | |
| 6,678,827 B1 | 1/2004 | Rothermel | |
| 6,684,244 B1 | 1/2004 | Goldman et al. | |
| 6,694,434 B1 | 2/2004 | McGee et al. | |
| 6,798,757 B2 | 9/2004 | Mizutani et al. | |
| 6,804,722 B1 | 10/2004 | Nishi | |
| 6,839,766 B1 | 1/2005 | Parnafes et al. | |
| 6,944,183 B1 | 9/2005 | Iyer et al. | |
| 6,954,790 B2 | 10/2005 | Forslöw | |
| 6,973,488 B1 | 12/2005 | Yavatkar et al. | |
| 7,003,562 B2 | 2/2006 | Mayer | |
| 7,089,592 B2 | 8/2006 | Adjaoute | |
| 7,103,772 B2 | 9/2006 | Jorgensen et al. | |
| 7,136,645 B2 | 11/2006 | Hanson et al. | |
| 7,136,907 B1 | 11/2006 | Nordstrom et al. | |
| 7,194,689 B2 | 3/2007 | Manni et al. | |
| 7,222,359 B2 | 5/2007 | Freund et al. | |
| 7,249,369 B2 | 7/2007 | Knouse et al. | |
| 7,308,703 B2 | 12/2007 | Wright et al. | |
| 7,317,699 B2 | 1/2008 | Godfrey et al. | |
| 7,346,340 B2 | 3/2008 | Purnadi et al. | |
| 7,386,888 B2 | 6/2008 | Liang et al. | |
| 7,428,583 B1 | 9/2008 | Lortz et al. | |
| 7,448,067 B2 | 11/2008 | Yadav | |
| 7,506,155 B1 | 3/2009 | Stewart et al. | |
| 7,546,629 B2 | 6/2009 | Albert et al. | |
| 7,562,388 B2 | 7/2009 | Hackenberger et al. | |
| 7,574,208 B2 | 8/2009 | Hanson et al. | |
| 7,665,118 B2 | 2/2010 | Mann et al. | |
| 7,669,237 B2 | 2/2010 | Shahbazi | |
| 7,734,284 B2 | 6/2010 | Adams et al. | |
| 7,774,363 B2 | 8/2010 | Lim | |
| 7,774,504 B2 | 8/2010 | Chene et al. | |
| 7,853,998 B2 | 12/2010 | Blaisdell et al. | |
| 7,865,938 B2 | 1/2011 | Shahbazi | |
| 7,971,232 B2 | 6/2011 | Hasbun | |
| 8,010,997 B2 | 8/2011 | Limont et al. | |
| 8,131,851 B2 * | 3/2012 | Harlow | 709/224 |
| 8,134,954 B2 | 3/2012 | Godfrey et al. | |
| 8,259,568 B2 | 9/2012 | Laudermilch et al. | |
| 8,259,611 B2 | 9/2012 | Godfrey et al. | |
| 8,341,693 B2 | 12/2012 | Shahbazi | |
| 8,495,700 B2 | 7/2013 | Shahbazi | |
| 8,565,726 B2 | 10/2013 | Walker et al. | |
| 8,572,676 B2 | 10/2013 | Sapp et al. | |
| 8,635,661 B2 | 1/2014 | Shahbazi | |
| 8,750,108 B2 | 6/2014 | Laudermilch et al. | |
| 8,850,530 B2 | 9/2014 | Shahbazi | |
| 2001/0039624 A1 | 11/2001 | Kellum | |
| 2001/0041576 A1 | 11/2001 | I'Anson et al. | |
| 2002/0027569 A1 | 3/2002 | Manni et al. | |
| 2002/0032853 A1 | 3/2002 | Preston et al. | |
| 2002/0068559 A1 | 6/2002 | Sharma et al. | |
| 2002/0098830 A1 | 7/2002 | Lauper et al. | |
| 2002/0098840 A1 | 7/2002 | Hanson et al. | |
| 2002/0120599 A1 | 8/2002 | Knouse et al. | |
| 2002/0184532 A1 | 12/2002 | Hackenberger et al. | |
| 2002/0194317 A1 | 12/2002 | Kanada et al. | |
| 2003/0028651 A1 | 2/2003 | Schreckengast et al. | |
| 2003/0037129 A1 | 2/2003 | Beadles et al. | |
| 2003/0081621 A1 | 5/2003 | Godfrey et al. | |
| 2003/0108015 A1 | 6/2003 | Li | |
| 2003/0130953 A1 | 7/2003 | Narasimhan et al. | |
| 2003/0140246 A1 | 7/2003 | Kammer et al. | |
| 2003/0162555 A1 | 8/2003 | Loveland | |
| 2003/0167405 A1 | 9/2003 | Freund et al. | |
| 2003/0177389 A1 | 9/2003 | Albert et al. | |
| 2003/0182394 A1 | 9/2003 | Ryngler et al. | |
| 2003/0228866 A1 | 12/2003 | Pezeshki | |
| 2004/0009768 A1 | 1/2004 | Waters et al. | |
| 2004/0022258 A1 | 2/2004 | Tsukada et al. | |
| 2004/0030705 A1 | 2/2004 | Bowman-Amuah | |
| 2004/0030796 A1 | 2/2004 | Cooper et al. | |
| 2004/0043762 A1 | 3/2004 | Kim et al. | |
| 2004/0054739 A1 * | 3/2004 | Friend et al. | 709/206 |
| 2004/0064727 A1 | 4/2004 | Yadav | |
| 2004/0076128 A1 | 4/2004 | Rao et al. | |
| 2004/0083382 A1 | 4/2004 | Markham et al. | |
| 2004/0123150 A1 | 6/2004 | Wright et al. | |
| 2004/0128394 A1 | 7/2004 | Knauerhase et al. | |
| 2004/0179690 A1 | 9/2004 | Soliman | |
| 2004/0214570 A1 | 10/2004 | Zhang et al. | |
| 2004/0225524 A1 | 11/2004 | Narasimhan et al. | |
| 2004/0266395 A1 | 12/2004 | Pailles et al. | |
| 2004/0268145 A1 | 12/2004 | Watkins et al. | |
| 2005/0022012 A1 | 1/2005 | Bluestone et al. | |
| 2005/0055578 A1 | 3/2005 | Wright et al. | |
| 2005/0060393 A1 | 3/2005 | Parnafes et al. | |
| 2005/0097199 A1 | 5/2005 | Woodard et al. | |
| 2005/0101293 A1 | 5/2005 | Mentze et al. | |
| 2005/0135375 A1 | 6/2005 | Hurtta et al. | |
| 2005/0164691 A1 | 7/2005 | Payne | |
| 2005/0198306 A1 | 9/2005 | Palojarvi et al. | |
| 2005/0203881 A1 | 9/2005 | Sakamoto et al. | |
| 2005/0251853 A1 | 11/2005 | Bhargavan et al. | |
| 2005/0254652 A1 | 11/2005 | Engler et al. | |
| 2005/0255838 A1 | 11/2005 | Adams et al. | |
| 2005/0257246 A1 | 11/2005 | Adams et al. | |
| 2005/0262343 A1 | 11/2005 | Jorgensen et al. | |
| 2005/0268326 A1 | 12/2005 | Bhargavan et al. | |
| 2006/0005254 A1 | 1/2006 | Ross | |
| 2006/0031351 A1 | 2/2006 | Marston et al. | |
| 2006/0036730 A1 | 2/2006 | Graham et al. | |
| 2006/0075472 A1 | 4/2006 | Sanda et al. | |
| 2006/0089938 A1 | 4/2006 | Leonard et al. | |
| 2006/0095953 A1 | 5/2006 | Frank | |
| 2006/0112427 A1 | 5/2006 | Shahbazi | |
| 2006/0130139 A1 | 6/2006 | Sobel et al. | |
| 2006/0141995 A1 | 6/2006 | Purnadi et al. | |
| 2006/0161646 A1 | 7/2006 | Chene et al. | |
| 2006/0184490 A1 | 8/2006 | Heim et al. | |
| 2006/0190684 A1 | 8/2006 | McCammon et al. | |
| 2006/0190984 A1 | 8/2006 | Heard et al. | |
| 2006/0224742 A1 | 10/2006 | Shahbazi | |
| 2006/0277590 A1 | 12/2006 | Limot et al. | |
| 2007/0006289 A1 | 1/2007 | Limot et al. | |
| 2007/0088948 A1 | 4/2007 | Ji et al. | |
| 2007/0143824 A1 | 6/2007 | Shahbazi | |
| 2007/0156670 A1 | 7/2007 | Lim | |
| 2007/0156694 A1 | 7/2007 | Lim | |
| 2007/0157287 A1 | 7/2007 | Lim | |
| 2007/0157288 A1 | 7/2007 | Lim | |
| 2007/0169168 A1 | 7/2007 | Lim | |
| 2007/0186275 A1 | 8/2007 | Shahbazi | |
| 2007/0266422 A1 | 11/2007 | Germano et al. | |
| 2008/0034401 A1 | 2/2008 | Wang | |
| 2008/0052383 A1 | 2/2008 | O'Shaughnessy et al. | |
| 2008/0065700 A1 | 3/2008 | Lim | |
| 2008/0066149 A1 | 3/2008 | Lim | |
| 2008/0070495 A1 | 3/2008 | Stricklen et al. | |
| 2008/0098062 A1 | 4/2008 | Balia | |
| 2008/0125102 A1 | 5/2008 | Abel et al. | |
| 2008/0137593 A1 | 6/2008 | Laudermilch et al. | |
| 2008/0184200 A1 | 7/2008 | Burns et al. | |
| 2008/0184201 A1 | 7/2008 | Burns et al. | |
| 2008/0184277 A1 | 7/2008 | Burns et al. | |
| 2008/0209505 A1 | 8/2008 | Ghai et al. | |
| 2009/0049166 A1 | 2/2009 | Roman et al. | |
| 2009/0049518 A1 | 2/2009 | Roman et al. | |
| 2009/0138939 A1 | 5/2009 | Kumar et al. | |
| 2009/0164560 A1 | 6/2009 | Fiatal | |
| 2009/0265754 A1 | 10/2009 | Hinds | |
| 2009/0298478 A1 | 12/2009 | Tyhurst et al. | |
| 2009/0322890 A1 | 12/2009 | Bocking et al. | |
| 2010/0037088 A1 | 2/2010 | Krivopaltsev et al. | |
| 2010/0064341 A1 | 3/2010 | Aldera | |
| 2010/0112983 A1 | 5/2010 | Walker et al. | |

(56) References Cited

U.S. PATENT DOCUMENTS

| | | | |
|---|---|---|---|
| 2010/0115581 A1 | 5/2010 | Goldschlag et al. | |
| 2010/0115582 A1 | 5/2010 | Sapp et al. | |
| 2010/0154025 A1 | 6/2010 | Balducci et al. | |
| 2010/0191847 A1* | 7/2010 | Raleigh .................... | 709/224 |
| 2011/0004913 A1 | 1/2011 | Nagarajan et al. | |
| 2011/0162049 A1 | 6/2011 | Shahbazi | |
| 2011/0167470 A1 | 7/2011 | Walker et al. | |
| 2011/0320819 A1 | 12/2011 | Weber et al. | |
| 2012/0270522 A1 | 10/2012 | Laudermilch et al. | |
| 2012/0270523 A1 | 10/2012 | Laudermilch et al. | |
| 2013/0047219 A1 | 2/2013 | Shahbazi | |

FOREIGN PATENT DOCUMENTS

| | | |
|---|---|---|
| EP | 1041506 | 10/2000 |
| EP | 1540446 | 6/2005 |
| EP | 1709556 | 7/2005 |
| EP | 1866789 | 12/2007 |
| EP | 2345205 | 7/2011 |
| GB | 1 496 984 | 12/1975 |
| WO | WO 00/16190 | 3/2000 |
| WO | WO 02/19116 | 3/2002 |
| WO | WO 02/44892 | 6/2002 |
| WO | WO 03/027878 | 4/2003 |
| WO | WO 03/090492 | 10/2003 |
| WO | WO 2004/021114 | 3/2004 |
| WO | WO 2004/057834 | 7/2004 |
| WO | WO 2005/064498 | 7/2005 |
| WO | WO 2005/107144 | 11/2005 |
| WO | WO 2006/093917 | 9/2006 |
| WO | WO 2007/073278 | 6/2007 |
| WO | WO 2008/109866 | 9/2008 |
| WO | WO 2010/054258 | 5/2010 |

OTHER PUBLICATIONS

Non-Final Office Action in U.S. Appl. No. 13/630,830 mailed on Aug. 26, 2013.
Request for Continued Examination and Amendment in U.S. Appl. No. 13/459,213, filed Sep. 11, 2013.
Advisory Action in U.S. Appl. No. 13/459,216 mailed on Jul. 19, 2013.
Final Office Action in U.S. Appl. No. 12/614,319 mailed on Aug. 7, 2013.
Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.m spx (printed Jul. 1, 2010, © 2010).
"Face-Image Capturing Method for Unattended Terminal", IBM Technical Disclosure Bulletin, IBM Corporation, New York, US, vol. 38, No. 1, Jan. 1995, pp. 101-102, XP000498703 ISSN: 0018-8689.
"Can You Manage an iPhone Like a BlackBerry?", Network World Middle East, Copyright IDG Middle East, Jul. 9, 2009 (3 pages).
"GuardianEdge Releases Smartphone Protection Product", ComputerTechnology Review, Nov. 28, 2007 (1 page).
Nayak, et al., "Security Issues in Mobile Data Networks," Vehicular Technology Conference, 2004; VTC2004-Fall 2004; IEEE 60th., vol. 5, pp. 3229-3233.
International Preliminary Examination Report for International Application No. PCT/US03/26645 completed Mar. 3, 2005 (6 pages).
PCT Written Opinion in International Application Serial No. PCT/US03/26645 mailed on Jan. 21, 2005 (7 Pages).
International Search Report for International Application No. PCT/US03/26645 mailed Feb. 13, 2004 (3 pages).
International Preliminary Examination Report for International Application No. PCT/US04/042565 mailed Jul. 17, 2006 (7 pages).
Written Opinion of the International Searching Authority for International Application No. PCT/US04/42565 mailed May 25, 2005 (6 pages).
International Search Report for International Application No. PCT/US04/42565 mailed May 25, 2005 (1 page).
Supplementary European Search Report for EPO Application No. EP 04 81 4713 completed Apr. 25, 2007.
EPO Replacement International Search Report for EP Application No. 04814713.6-1238/1709556 mailed on May 30, 2011.
European Patent Office Communication Pursuant to Article 94(3) EPC (Examination Report) dated Sep. 29, 2011 in EP Application No. 04814713.6.
International Preliminary Report on Patentability issued Mar. 24, 2009 (1 page) and Written Opinion of the International Searching Authority mailed Feb. 29, 2008 (4 pages) for International Application No. PCT/US06/06968.
International Search Report for International Application No. PCT/US06/06968 mailed Feb. 29, 2008 (1 page).
International Search Report and Written Opinion for International Application No. PCT/US2009/063640 mailed Apr. 20, 2010 (13 pages).
International Preliminary Report on Patentability and Written Opinion for International Application No. PCT/US2009/063640 mailed on May 19, 2011 (10 pages).
European Patent Office Communication Pursuant to Rules 161(1) and 162 EPC in EP Application No. 09759830.4-1244 mailed on Jun. 15, 2011.
Non-Final Office Action in U.S. Appl. No. 10/527,235 mailed on Jun. 28, 2006.
Response to Non-Final Office Action dated Jun. 28, 2006 in U.S. Appl. No. 10/527,235, filed Sep. 28, 2006.
Final Office Action in U.S. Appl. No. 10/527,235 mailed on Dec. 12, 2006.
Request for Continued Examination and Amendment in U.S. Appl. No. 10/527,235, filed Jun. 12, 2007.
Non-Final Office Action in U.S. Appl. No. 10/527,235 mailed on Aug. 28, 2007.
Response to Non-Final Office Action dated Aug. 28, 2007 in U.S. Appl. No. 10/527,235, filed Feb. 28, 2008.
Final Office Action in U.S. Appl. No. 10/527,235 mailed on Jul. 11, 2008.
Request for Continued Examination and Amendment in U.S. Appl. No. 10/527,235, filed Dec. 11, 2008.
Non-Final Office Action in U.S. Appl. No. 10/527,235 mailed on Jan. 9, 2009.
Response to Non-Final Office Action dated Jan. 9, 2009 in U.S. Appl. No. 10/527,235, filed Jul. 9, 2009.
Notice of Allowance in U.S. Appl. No. 10/527,235 mailed on Oct. 5, 2009.
Non-Final Office Action in U.S. Appl. No. 11/441,049 mailed on Oct. 17, 2006.
Response to Non-Final Office Action dated Oct. 17, 2006 in U.S. Appl. No. 11/441,049, filed Jan. 17, 2007.
Final Office Action in U.S. Appl. No. 11/441,049 mailed on Mar. 22, 2007.
Request for Continued Examination and Amendment in U.S. Appl. No. 11/441,049, filed Jun. 22, 2007.
Non-Final Office Action in U.S. Appl. No. 11/441,049 mailed on Sep. 24, 2007.
Response to Non-Final Office Action dated Sep. 24, 2007 in U.S. Appl. No. 11/441,049, filed Mar. 24, 2008.
Final Office Action in U.S. Appl. No. 11/441,049 mailed on Jul. 9, 2008.
Request for Continued Examination and Amendment in U.S. Appl. No. 11/441,049, filed Jan. 9, 2009.
Non-Final Office Action in U.S. Appl. No. 11/441,049 mailed on Feb. 2, 2009.
Examiner Interview Summary in U.S. Appl. No. 11/441,049 mailed on Jul. 27, 2009.
Response to Non-Final Office Action dated Feb. 2, 2009 in U.S. Appl. No. 11/441,049, filed Aug. 27, 2009.
Non-Final Office Action in U.S. Appl. No. 11/441,049 mailed on Dec. 10, 2009.
Response to Non-Final Office Action dated Dec. 10, 2009 in U.S. Appl. No. 11/441,049, filed Jun. 10, 2010.

(56) References Cited

OTHER PUBLICATIONS

Examiner Interview Summary in U.S. Appl. No. 11/441,049 mailed on Jun. 14, 2010.
Notice of Allowance in U.S. Appl. No. 11/441,049 mailed on Aug. 23, 2010.
U.S. Appl. No. 12/972,410, filed Dec. 17, 2010, entitled "Enterprise-Wide Security System for Computer Devices," Inventor Majid Shahbazi.
Non-Final Office Action in U.S. Appl. No. 12/972,410 mailed on Sep. 21, 2011.
Response to Non-Final Office Action in U.S. Appl. No. 12/972,410, filed Dec. 21, 2011.
Final Office Action in U.S. Appl. No. 12/972,410 mailed on Mar. 7, 2012.
Request for Continued Examination and Amendment in U.S. Appl. No. 12/972,410, filed Jun. 7, 2012.
Notice of Allowance in U.S. Appl. No. 12/972,410 mailed on Jun. 25, 2012.
Request for Continued Examination in U.S. Appl. No. 12/972,410, filed Sep. 23, 2012.
Notice of Allowance in U.S. Appl. No. 12/972,410 mailed on Oct. 17, 2012.
U.S. Appl. No. 13/630,830, filed Sep. 28, 2012 entitled "Enterprise-Wide Security System for Computer Devices", Inventor, Majid Shahbazi.
Non-Final Office Action in U.S. Appl. No. 11/578,420 mailed on Sep. 16, 2010.
Response to Non-Final Office Action dated Sep. 16, 2010 in U.S. Appl. No. 11/578,420, filed Dec. 16, 2010.
Final Office Action in U.S. Appl. No. 11/578,420 mailed on Mar. 4, 2011.
Request for Continued Examination and Amendment in U.S. Appl. No. 11/578,420, filed Jun. 6, 2011.
Non-Final Office Action in U.S. Appl. No. 11/578,420 mailed on Jun. 22, 2011.
Response to Non-Final Office Action dated Jun. 22, 2011 in U.S. Appl. No. 11/578,420, filed Sep. 21, 2011.
Non-Final Office Action in U.S. Appl. No. 11/578,420 mailed on Dec. 1, 2011.
Response to Non-Final Office Action dated Dec. 1, 2011 in U.S. Appl. No. 11/578,420, filed Mar. 1, 2012.
Final Office Action in U.S. Appl. No. 11/578,420 mailed on May 14, 2012.
Request for Continued Examination and Amendment in U.S. Appl. No. 11/578,420, filed Aug. 14, 2012.
Notice of Allowance in U.S. Appl. No. 11/578,420 mailed on Sep. 26, 2012.
Request for Continued Examination in U.S. Appl. No. 11/578,420, filed Dec. 21, 2012.
Notice of Allowance in U.S. Appl. No. 11/578,420 mailed on Jan. 18, 2013.
Request for Continued Examination and Amendment in U.S. Appl. No. 11/578,420, filed Apr. 18, 2013.
Non-Final Office Action in U.S. Appl. No. 11/363,283 mailed on Jun. 2, 2009.
Response to Non-Final Office Action dated Jun. 2, 2009 in U.S. Appl. No. 11/363,283, filed Oct. 2, 2009.
Final Office Action in U.S. Appl. No. 11/363,283 mailed on Jan. 5, 2010.
Request for Continued Examination and Amendment in U.S. Appl. No. 11/363,283, filed Jul. 6, 2010.
Non-Final Office Action in U.S. Appl. No. 11/363,283 mailed on Sep. 23, 2010.
Response to Non-Final Office Action dated Sep. 23, 2010 in U.S. Appl. No. 11/363,283, filed Dec. 20, 2010.
Final Office Action in U.S. Appl. No. 11/363,283 mailed on Mar. 9, 2011.
Requested for Continued Examination and Amendment in U.S. Appl. No. 11/363,283, filed Jun. 9, 2011.
Non-Final Office Action in U.S. Appl. No. 11/363,283 mailed on Aug. 17, 2011.
Response to Non-Final Office Action dated Aug. 17, 2011 in U.S. Appl. No. 11/363,283, filed Nov. 17, 2011.
Final Office Action in U.S. Appl. No. 11/363,283 mailed on Jan. 30, 2012.
Request for Continued Examination and Amendment in U.S. Appl. No. 11/363,283, filed Apr. 29, 2012.
Notice of Allowance in U.S. Appl. No. 11/363,283 mailed on Jan. 7, 2013.
Request for Continued Examination in U.S. Appl. No. 11/363,283, filed Apr. 8, 2013.
Notice of Allowance in U.S. Appl. No. 11/363,283 mailed on May 24, 2013.
Non-Final Office Action in U.S. Appl. No. 11/877,656 mailed on Aug. 6, 2010.
Response to Non-Final Office Action dated Aug. 6, 2010 in U.S. Appl. No. 11/877,656, filed Nov. 8, 2010.
Final Office Action in U.S. Appl. No. 11/877,656 mailed on Mar. 1, 2011.
Request for Continued Examination and Amendment in U.S. Appl. No. 11/877,656, filed Jun. 1, 2011.
Notice of Allowance in U.S. Appl. No. 11/877,656 mailed on Jul. 12, 2011.
Request for Continued Examination and Amendment in U.S. Appl. No. 11/877,656, filed Sep. 22, 2011.
Notice of Allowance in U.S. Appl. No. 11/877,656 mailed on Oct. 5, 2011.
Request for Continued Examination in U.S. Appl. No. 11/877,656, filed Jan. 4, 2012.
Notice of Allowance in U.S. Appl. No. 11/877,656 mailed on Jan. 24, 2012.
Request for Continued Examination in U.S. Appl. No. 11/877,656, filed Mar. 14, 2012.
Notice of Allowance in U.S. Appl. No. 11/877,656 mailed on Mar. 29, 2012.
Request for Continued Examination in U.S. Appl. No. 11/877,656, filed Jun. 29, 2012.
Notice of Allowance in U.S. Appl. No. 11/877,656 mailed on Jul. 20, 2012.
U.S. Appl. No. 13/459,213, filed Apr. 29, 2012, entitled "System and Method for Controlling Mobile Device Access to a Network"; inventors Norm Laudermilch et al.
Non-Final Office Action in U.S. Appl. No. 13/459,213 mailed on Dec. 17, 2012.
Response to Non-Final Office Action dated Dec. 17, 2012 in U.S. Appl. No. 13/459,213, filed Mar. 18, 2013.
Final Office Action in U.S. Appl. No. 13/459,213 mailed on Jun. 11, 2013.
U.S. Appl. No. 13/459,216, filed Apr. 29, 2012, entitled "System and Method for Controlling Mobile Device Access to a Network"; inventors Norm Laudermilch et al.
Non-Final Office Action in U.S. Appl. No. 13/459,216 mailed on Dec. 7, 2012.
Response to Non-Final Office Action dated Dec. 7, 2012 in U.S. Appl. No. 13/459,216, filed Mar. 7, 2013.
Final Office Action in U.S. Appl. No. 13/459,216 mailed on Mar. 26, 2013.
Non-Final Office Action in U.S. Appl. No. 12/614,319 mailed on Apr. 19, 2012.
Response to Non-Final Office Action dated Apr. 19, 2012 in U.S. Appl. No. 12/614,319, filed Jun. 22, 2012.
Final Office Action in U.S. Appl. No. 12/614,319 mailed on Sep. 20, 2012.
Request for Continued Examination and Amendment in U.S. Appl. No. 12/614,319, filed Nov. 28, 2012.
Non-Final Office Action in U.S. Appl. No. 12/614,319 mailed on Feb. 7, 2013.
Response to Non-Final Office Action dated Feb. 7, 2013 in U.S. Appl. No. 12/614,319, filed May 7, 2013.
Non-Final Office Action in U.S. Appl. No. 12/614,326 mailed on Dec. 16, 2011.

(56) References Cited

OTHER PUBLICATIONS

Response to Non-Final Office Action in U.S. Appl. No. 12/614,326, filed Mar. 16, 2012.
Final Office Action in U.S. Appl. No. 12/614,326 mailed on May 10, 2012.
Request for Continued Examination and Amendment in U.S. Appl. No. 12/614,326, filed Aug. 10, 2012.
Non-Final Office Action in U.S. Appl. No. 12/614,326 mailed on Dec. 12, 2012.
Response to Non-Final Office Action dated Dec. 12, 2012 in U.S. Appl. No. 12/614,326, filed Mar. 8, 2013.
Notice of Allowance in U.S. Appl. No. 12/614,326 mailed on Mar. 19, 2013.
Non-Final Office Action in U.S. Appl. No. 12/614,333 mailed on Mar. 28, 2012.
Response to Non-Final Office Action dated Mar. 28, 2012 in U.S. Appl. No. 12/614,333, filed May 29, 2012.
Final Office Action in U.S. Appl. No. 12/614,333 mailed on Aug. 1, 2012.
Request for Continued Examination and Amendment in U.S. Appl. No. 12/614,333, filed Nov. 1, 2012.
Notice of Allowance in U.S. Appl. No. 12/614,333 mailed on Mar. 5, 2013.
Request for Continued Examination in U.S. Appl. No. 12/614,333, filed Jun. 5, 2013.
U.S. Appl. No. 12/830,861, filed Jul. 6, 2010, entitled "Mobile Data Security System and Methods".
Non-Final Office Action in U.S. Appl. No. 12/830,861 mailed on Jun. 21, 2012.
AF Response to Final Office Action dated Mar. 26, 2013 in U.S. Appl. No. 13/459,216, filed Jun. 26, 2013.
Request for Continued Examination in U.S. Appl. No. 12/614,326, filed Jun. 19, 2013.
Notice of Allowance in U.S. Appl. No. 12/614,326 mailed on Jul. 15, 2013.
Notice of Allowance in U.S. Appl. No. 12/614,333 mailed on Jul. 1, 2013.
Notice of Allowance in U.S. Appl. No. 13/459,213 mailed on Jan. 27, 2014.
European Patent Office Extended Search Report and Written Opinion in EP Application Serial No. 13186544.6-1955 mailed on Apr. 14, 2014.
Notice of Allowance in U.S. Appl. No. 13/630,830 mailed on May 1, 2014.
U.S. Appl. No. 14/299,085, filed Jun. 9, 2014 and entitled "System and Method for Controlling Mobile Device Access to a Network"; inventors Norm Laudermilch et al.
European Patent Office Extended Search Report and Written Opinion in EP Application Serial No. 13186544.6-1955 mailed on Apr. 24, 2014.
Notice of Allowance in U.S. Appl. No. 11/578,420 mailed on Sep. 17, 2013.
Corrected Notice of Allowance in U.S. Appl. No. 11/578,420 mailed on Oct. 23, 2013.
Notice of Allowance in U.S. Appl. No. 13/459,219 mailed on Oct. 9, 2013.
European Patent Office Extended Search Report and Written Opinion in EP Application Serial No. 06736310.1-1853 mailed on May 28, 2014.
U.S. Appl. No. 14/499,754, filed Sep. 24, 2014, entitled Enterprise-Wide Security System for Computer Devices, Inventor Majid Shahbazi (39 pages).

* cited by examiner

DISTRIBUTED DATA REVOCATION USING DATA COMMANDS

CROSS-REFERENCES TO RELATED APPLICATIONS

This application claims the benefit of priority from provisional application No. 61/332,088 filed May 6, 2010, incorporated herein by reference.

STATEMENT REGARDING FEDERALLY SPONSORED RESEARCH OR DEVELOPMENT

Not applicable.

FIELD

The technology herein relates to systems, software and methods for implementing and managing security policies for mobile, portable and other devices of diverse types. More particularly, the technology herein relates to automated translation of policy specifications into data commands that effect information stored upon a device and the resulting operations upon a device that implement policy enforcement. The technology herein has applications in the areas including but not limited to portable, mobile and other devices and enterprise network security and information management.

BACKGROUND AND SUMMARY

Small portable computing devices have become ubiquitous. It is now common to see people reading their email, reviewing documents and performing various other tasks on the bus, the subway, in the park, in restaurants and just about anywhere else, using an ever-expanding range of devices. Some devices resemble personal digital assistants (PDA's), others include cellular telephone and other wireless communications functionality, and still others (e.g., the Apple IPAD) take the form of tablet computers. Business and other organizations and enterprises have embraced such technologies because of the increase in productivity and flexibility they can provide to employees and consultants.

As the variety of such portable devices has become more diverse, so have the challenges associated with enterprise or other centralized management of such devices. Security and configuration managers can use device-appropriate policy management protocols and policy servers to manage devices that connect to their networks to maintain network security, manage use of resources, detect or prevent misuse, control access to information using various policies for the different device types in use. To facilitate this, some enterprises try to standardize on only one type of handheld device that will be supported. However, end users often pressure their employers and IT specialists to support various devices. Since many users are not willing to carry multiple devices, users often end up using the same handheld device for both business and personal use. Such dual usage can create a host of management channels for enterprise IT personnel who need to be able to carefully manage and safeguard information belonging to the enterprise without comprising the user's own personal information.

Existing policy-based systems typically enable authentication of devices attempting to access the network, verifying required device configurations, and blocking access to and reporting access attempts by devices that are not authorized or configured as required by policy.

Policy Management

Policy management provides a range of powerful tools to enable or effect devices and device capabilities. Generally speaking, policies comprise one or more policy elements that each define one or more aspects of a device's configuration and/or permitted access modes. Policies are defined in various ways, depending on the device type they apply to, the policy server used to install them and/or to verify device compliance with them. Policies are typically disseminated from policy servers, which act as a source of policies for transport to the devices they apply to, using various policy management protocols. Policy management protocols may comprise protocols for interaction between policy servers and devices receiving policies. These protocols can provide means not only to transfer the policy to the receiving device or devices, but also to manage policies on those devices, such as by verifying that the policy has been received by the device, verifying device compliance with the policy, removing the policy, updating the policy, or other policy-related activities. The manner in which these functions are accomplished varies from one policy management protocol to another, and the functions supported also vary.

Applying a policy to user devices can be challenging for a variety of reasons, such as the plethora of mobile device types from various manufacturers, a plurality of management protocols developed by different device vendors for setting and verifying device parameters, and inconsistency between device manufacturers in the device configuration elements that are exposed and the device configuration elements that can be managed by the policy management protocols supported.

Policy management systems traditionally manage policies and data separately, and prior art policy management systems typically provide both policy and policy enforcement agents for policy, and data and data management applications for data.

In some cases, aspects of device functionality that it is desirable to manage are not supported by the policy mechanisms supplied by the device manufacturer or the on-device policy capabilities. For example, it may be desirable to remotely cause the deletion of specific information or types of information from the local storage on the device without affecting other information or types of information. This may not be possible if the policy protocol or on-device protocol support software permits only an all-or-nothing deletion mechanism, where all on-device data can be deleted under policy control, but there is no way to delete only selected information.

Policy management protocol implementations or "policy transports" are sometimes embedded within a broader data stream, such as where policy and data are passed between an applications server and a user device. Well known policy transports include, for example, Microsoft ActiveSync™, BlackBerry™ Policy Service (BPS), Open Mobile Alliance™ (OMA) Device Management (OMA-DM), and Apple iPhone™ Configuration Utility among others. In some implementations, specialized software must be installed on a user device in order to enable the device to interoperate with a specific policy transport. This is inefficient and adds to deployment cost and complexity. When aspects of device operation that are not supported by a policy transport for a given device must be managed, additional specialized software may be required, thus compounding the problem. It would be advantageous to permit accomplishing the unsupported aspects of policy enforcement without such additional specialized software, such as by repurposing device or device software capabilities not specifically intended for policy enforcement. The following is a non-exhaustive survey of some such available technologies that include various degrees of policy management:

1.1.1 Microsoft Exchange ActiveSync™

Microsoft Exchange ActiveSync™ (EAS) is a protocol for connecting mobile, portable and other devices to Microsoft™ Exchange servers, allowing synchronization of e-mail and PIM (Personal Information Manager) data, such as tasks, calendars, and contacts, between Microsoft™ Exchange and the mobile device as well as limited policy management of the device by Microsoft™ Exchange.

Microsoft™ has implemented the EAS protocol on Microsoft™ Windows Mobile™ devices, and has licensed the protocol to third-parties for use with other mobile operating systems. Licensees include Nokia Symbian S60™, Sony Ericsson UIQ™, and Apple iPhone™, handset OEMs such as Motorola™, HTC™, and Samsung™ and third party synchronization vendors such as DataViz™. These vendors license and implement the client-side EAS Application Programming Interface (API).

The EAS protocol may include three relevant areas of processing: Handshake, E-mail/PIM Synchronization, and Policy Push. The term "push", as used herein, refers to a method of data or command transfer where a server initiates an exchange with a client. The opposite of a "push" is a "pull", where the exchange is initiated by the client. "Pull" is sometimes referred to as "polling" when a pull operation is performed on a periodic basis.

Handshake: Although EAS supports push e-mail from a server, EAS depends upon the mobile device to initiate the connection to the server. It is the device's responsibility to connect (and re-connect, if a connection is lost) to the server, to create the session over which e-mail, PIM, and policy information can be pushed. Establishment of a session generally involves an authentication handshake, which identifies the device user (by Active Directory™ (AD) Username) and the device (by EAS Device ID and EAS Policy Key) to the Microsoft™ Exchange Server, associating the session with a mailbox for the purpose of e-mail and PIM synchronization, and with a user and an AD group for the purpose of policy push. The EAS Policy Key is used as a first stage check to prevent continued communication if the Policy Key is not provided or is not valid. The user is authenticated either by passing the user's AD password in the protocol, or by using a client or machine certificate for client-side authentication.

E-mail/PIM Synchronization: Both the device and the Microsoft™ Exchange server can "push" new (or changed) information to each other. For example, new e-mail can be pushed from Microsoft™ Exchange to the device. New or modified contacts, calendar entries, and other PIM information can be pushed as well. E-mail sent from the device is pushed to the Microsoft™ Exchange Server, as well as PIM information created or changed on the device. The protocol specifies mechanisms for keeping changes synchronized between Microsoft™ Exchange and client devices.

Policy: The Microsoft™ Exchange Server can also push policies to the device. These policies can comprise actions such as "Device Wipe" which causes the device to clear its local storage and return the device configuration to its original factory state. Other policies can specify use of secure operation features, such as a requirement that the device lock itself after a period of (user) inactivity and require from the user a password or PIN of certain complexity to unlock. The device acknowledges receipt of such policies, so Microsoft™ Exchange can assume that the policy has been enforced.

1.1.2 Synchronization Using Microsoft Exchange ActivSync

In the Exchange ActivSync (EAS) protocol, synchronization is the process of reconciling differences between data that is stored on a client (such as a mobile device) and data that is kept on a server, such as a Microsoft Exchange server. Both the client and the server maintain their own copies of data and keep track of changes that have been made since the last time the two were synchronized. The client initiates synchronization by sending a sync command to the server to request that the server respond with updates. The server processes any updates that it receives, resolves any conflicts, and sends the list of changes back to the client, which updates its local copies to match.

The EAS protocol also provides a monitoring mechanism, "ping", that enables the client to request notification if specific folders on the server are changed, such as when a new e-mail message arrives in a folder. Because all synchronization is initiated by the client, the mechanism uses a ping-to-pull model in which the server sends a notification of the change to the client, and the client responds by requesting synchronization.

All communication between the client and server is initiated by the client. When the client communicates with the server, the client sends a request to the server as an HTTP POST message, using UTF-8 encoding. The server then sends back a response to the POST message. The request and response each have a header and a body (which may be empty). Each POST message contains a single command, such as a sync or ping command.

Before a folder can be synchronized, an initial synchronization key must be obtained from the server. The client obtains this synchronization key by sending the server an initial synchronization request where the synchronization key is zero. The server responds with updated data and a new synchronization key value, which is generated by the server for each transaction. The client stores the returned synchronization key and specifies it with its next synchronization request. To perform a full re-synchronization, the client deletes its local copy of the data in a folder and then requests synchronization with a synchronization key value of zero (0) to get the current data from the server.

The foldersync command synchronizes the folder list between the client and the server, but does not synchronize the data in the folders. Foldersync works similarly to the sync command. An initial foldersync command with a synchronization key of zero is required in order to obtain the list of folders and the synchronization key associated with that list. The returned synchronization key can be used in subsequent foldersync commands to obtain folder list changes from the server. A list containing all folder specifications is returned to the client when a foldersync is done with a synchronization key of zero.

1.1.3 BlackBerry™ Enterprise Server

BlackBerry™ Enterprise Server (BES) is a push-based server from Research In Motion™ (RIM™) that enables a secure, centrally managed link between BlackBerry™ devices and an organization's enterprise systems, applications, and wireless networks. It integrates with popular content sources such as e-mail and personal information management (PIM) systems such as IBM Lotus Domino™ and Microsoft™ Exchange, and is designed to provide secure access to e-mail, organizer data, instant messaging, Web browser, and other enterprise applications. It provides this access by retrieving information from enterprise content sources and "pushing" this content to a BlackBerry™ mobile device. In addition to applying policies to individual devices, administrators can create groups of mobile devices, then apply policies for one or more groups. Approximately 450 different policies can be applied to individual devices or groups of BlackBerry™ devices, ranging from enforcing password protection and controlling access to third party mobile applications, to controlling the use of certain device features, such as use of the camera or making video recordings.

1.1.4 Open Mobile Alliance™ Device Management

The Open Mobile Alliance™ (OMA) Device Management (DM) specification is designed for management of small mobile devices such as mobile phones, PDAs, and palm top computers. Device management includes, for example, provisioning, configuration, software installation or upgrade, and status reporting. A device may implement all or a subset of these features. Since the OMA-DM specification is intended for use with mobile devices, it is designed with sensitivity to memory and storage space limitations, communication bandwidth constraints, and security.

OMA-DM uses Extensible Markup Language (XML) for data exchange; specifically the sub-set defined by Synchronization Markup Language (SyncML). Device management is through a client-server relationship between a server and the client device being managed. OMA-DM is designed to support and utilize a variety of connection methods, such as Universal Serial Bus (USB) or RS-232 wired connections and wireless connections, such as Global System for Mobile communications (GSM), Code Division Multiple Access (CDMA), Infrared Data Association (IrDA) or Bluetooth. Transport can involve Website Project (WSP) or (Wireless Application Protocol (WAP)), Hypertext Transfer Protocol (HTTP), OBject EXchange (OBEX) or similar transport layers. Policy settings can be transferred in OMA Device Management Files (DDF), which are XML data files of known format.

The communication protocol used by OMA-DM is a request-response protocol. Authentication and challenge of authentication are included to ensure the server and client are communicating only after proper validation. The initial message from the server to a client is in the form of a notification, or alert message. Once the communication is established between the server and client, a sequence of messages is exchanged to complete a given device management task. OMA-DM provides for alerts, which are messages that can occur out of sequence, and can be initiated by either server or client. Such alerts are used to handle errors, abnormal terminations, etc.

The protocol specifies an exchange of "packages" during a session. The packages consist of several messages, and a message in turn consists of one or more commands. The server initiates the commands and the client executes the commands and returns the results in a reply message. In some instances, the command includes policy elements to be set on the device. In others, the command reports aspects of the device's configuration status back to the server.

1.1.5 iPhone™ Configuration Profiles iPhone™ Configuration profiles define one or more iPhone™ settings. Configuration profiles are XML files that contain device security policies and restrictions, virtual private network (VPN) configuration information, Wi-Fi™ settings, e-mail and calendar accounts, and authentication credentials that permit devices to work with enterprise systems. Configuration profiles can be installed on devices connected via USB using the iPhone™ Configuration Utility, or configuration profiles can be distributed by e-mail or through a webpage. When users open the profile e-mail attachment or download the profile using the Safari™ web browser on their device, they are prompted to begin the Configuration profile installation process.

1.1.6 Some Policy Enforcement Mechanisms

Generally speaking, previous policy enforcement mechanisms block access and/or usage rights to specific services on a network, or require the performance of a specific action on a policy-managed device. See as one example RFC2748— The COPS (Common Open Policy Service) Protocol. The first case (blocking) generally does not enforce the policy against specific data already on a policy managed device, and the second (requiring specific action) generally requires specialized software on the policy managed device, such as a policy enforcement agent. Both suffer drawbacks from their respective implementations.

The model of wiping all data from a mobile device upon termination of an employee is becoming increasingly problematic. Many mobile devices store information belonging to more than one user or organization, for example when a mobile device, such as an iPhone, is used in both a personal and a business capacity. Many of the current generation of "smart mobile devices" are employee-owned but used in work activities as well as in their personal lives. When some devices have such mixed uses and contain data owned by an organization as well as data the organization has no rights to, while other devices are used exclusively for organization purposes and are organization-owned, organizations need both the ability to selectively delete data, such as wiping the contents of the device e-mail client folders used for work activities and the ability to fully wipe the entire device. While most devices today incorporate a full-wipe capability as part of their normal security profile support functionality, the ability to selectively wipe only some of the data stored in a device is typically absent and requires the provisioning of specialty software on the mobile device to accomplish the selective wipe task.

Not infrequently, mobile devices are misplaced or stolen. In other cases, an employee will leave the company's employment with a personal device that has been connected to the corporate network and contains corporate data, such as e-mails containing proprietary information (e.g. e-mail addresses, customer data, project plans, etc.). With the multitude of situations that an organization may have to contend with, it is important for the organization to have a flexible capability for removal of confidential information from a mobile device without having to wipe the entire device.

If a mobile device is lost or stolen, it is important to be able to remotely wipe the device fully and restore it to factory defaults. Prior art methods exist to identify an individual device, remotely wipe the entire device and restore it to factory settings, and to deny further access to an organization's network resources by that device. Current solutions typically push a specialty command, called a "remote wipe", to the mobile device. This command causes the mobile device to remove all stored information and essentially returns the mobile device to the state it was in when it left the factory. This approach to wiping organizational information is very useful; as mentioned earlier, organizational data can exist in many places throughout the mobile device. It thus becomes important to have the capability to ensure that all organizational information can be wiped from a mobile device. Most or many current devices support such a capability.

While many use cases are served by fully wiping a mobile device, a full wipe may not always work as intended. For example, a full wipe does not work when a mobile device is configured with a firewall or other component that blocks the receipt or functioning of the "remote wipe" command. Similarly, disabling the mobile device-specific specialty client software can disable the "remote wipe" commands in devices making use of such specialty client software. In some devices, the process of performing a full wipe is not accomplished in a short time, and the device can run out of power and shut down before the wipe is complete.

Additionally, the need to selectively wipe portions of a mobile device comprising e.g., only those portions of the stored information belonging to the organization is needed, such as in cases where the device is not owned by the organization and a full wipe is inappropriate. For example, when an employee leaves an organization, the organization may want to focus on removing organizational e-mail and documents from the mobile device instead of wiping out the ex-employee's personal information, like music or family photos.

As will be clear from the disclosures below, exemplary illustrative non-limiting implementations are useful for meeting such needs without necessarily requiring specialty software to be present on the policy managed mobile device.

Non-limiting aspects of the technology herein relate to methods, systems, and devices for implementing one or more data management policies from an integrated policy server and/or one or more policy services to a mobile device that does not necessarily have a resident policy enforcement agent or application operating sufficient to enable all aspects of the policy.

An exemplary illustrative non-limiting method preferably comprises intercepting a data stream between a data server and the mobile device, identifying the mobile device, identifying a policy in an integrated policy server applicable to the mobile device based on the identity of the mobile device, the policy including one or more policy elements, identifying one or more of the policy elements based on the mobile device, and translating the policy elements into actions involving the data stream between the data server and the mobile device so as to implement at least one aspect of the identified policy. The actions can comprise permitting normal exchange of data between the data server and the mobile device, preventing communication between the data server and the mobile device, or modifying the data stream between the data server and the mobile device.

The method may further include one or more of the steps of removing one or more data elements from a data stream, adding one or more data elements to a data stream, and/or translating one or more of the policy elements into a form transmittable by one or more of the data streams.

One non-limiting aspect of technology herein is related to the policy-managed intermediation of data streams between a policy managed device and one or more servers, where the intermediation takes the form of translating one or more policy specifications into commands or instructions within the data stream that have the effect of enforcing the policy specification upon the mobile device. These commands and/or instructions are processed by the policy managed device using extant capabilities present in the managed device, typically in the software used to process the data stream, and do not necessarily require or use additional special purpose software on the mobile device. Thus, the requirement for any additional policy enforcement components on the mobile device can be eliminated, reducing the complexity of the mobile device configuration.

Furthermore, by repurposing the software used to process the data stream to also provide policy enforcement, the ability to prevent policy enforcement is reduced. Interference with policy enforcement requires that the data access software be prevented from functioning, which also prevents data access. Retaining ability to access the data is effective in enforcing the policy. Thus, the commands and/or data inserted into the data stream are effective for enforcing the policy intent on the policy-managed device.

In some exemplary illustrative non-limiting implementations, a policy proxy component intercepts communications between a mobile device and at least one server. Based at least in part on policy elements provided by a policy server, the policy proxy either permits communication between the mobile device and the one or more servers or limits communication between the mobile device and the one or more servers.

When required by the policy provided by the policy server, the policy proxy inserts, removes or substitutes data or commands in the communication stream to the mobile device that cause the mobile device to delete at least some of the data it has stored in its local data storage subsystems. When required by the policy provided by the policy server, the policy proxy inserts, removes or substitutes data or commands in the communication stream to the mobile device that cause the mobile device to delete all of the data it has stored in its local storage components. When required by the policy provided by the policy server, the policy proxy can also alter the configuration of the mobile device and/or the configuration of one or more servers, network devices or other components required for access to the policy-protected network so as to prevent the mobile device gaining access in the future.

The functionality of the policy proxy can be implemented in a variety of arrangements, such as with a separate network device, by embedding the functionality into an existing network device, such as a network router, switch or firewall, by incorporating the policy proxy functionality into a policy server system, into each server that connects to mobile devices directly or indirectly, in a virtual machine or network appliance, or by any other appropriate mechanism.

BRIEF DESCRIPTION OF THE DRAWINGS

The technology herein will be understood more fully from the detailed description given below of various exemplary illustrative non-limiting implementations and the accompanying drawings, of which.

DETAILED DESCRIPTION

Definitions (If Applicable)

The following definitions are used throughout, unless specifically indicated otherwise:

| TERM | DEFINITION |
|---|---|
| Policy | One or more policy elements. |
| Policy Element | Defines one or more aspects of the mobile device's configuration. |
| Policy Server | A source of policies for transport to the devices they apply to, using various policy management protocols |
| Policy Transport | A policy management protocol and the policy server that implements it. |
| Policy Management Protocol | Protocols for interaction between policy servers and devices receiving policies. These can provide means to transfer policies to receiving devices, to manage policies on those devices, or enable other policy-related activities |

Exemplary System Architecture

Figure 1:
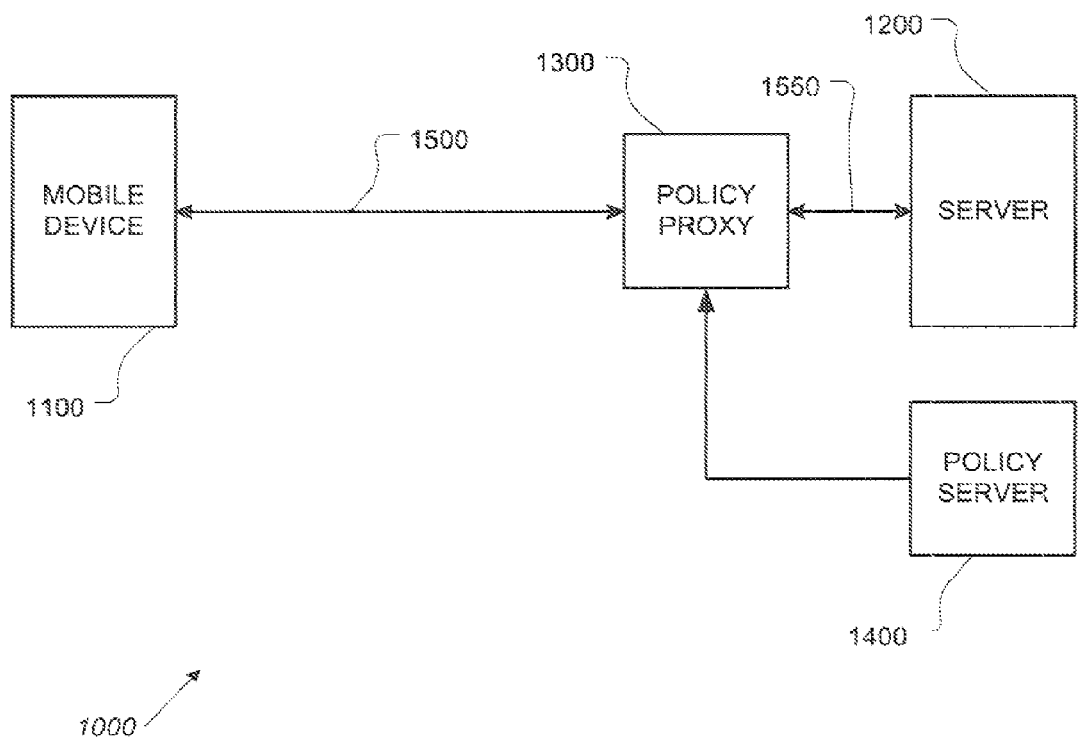
FIG. 1 illustrates a simplified architecture of an exemplary illustrative non-limiting policy proxy system.

FIG. 1 is a simplified architectural rendering of an exemplary implementation of a system incorporating a policy proxy. The example system 1000 comprises at least one mobile device 1100 in communication with an applications server 1200 using a communication path 1500/1550. Mobile device 1100 can comprise any kind of portable, mobile, handheld, desktop or other computing device. It can include one or more input devices such as keyboards, buttons, touch screens, voice command inputs, etc.; and one or more output devices such as displays, lights, speakers or any other device providing tactile, audio or visual or other outputs. It can provide wireless, wired or other networking connectivity using a local area network, a wide area network, a cellular telephone network, the Internet or any other type of network or other data communications capability. It can include an internal processor connected to one or more memory devices that store data and programs. The internal processor can execute programs stored in the memory devices to perform the functions explained in more detail below. The user can interact with the device 1100 but inputting information through the input components, and receive humanly perceivable feedback or other information via output components.

Applications server 1200 can comprise one or more computers including a processor, memory, disk storage, networking capabilities, input devices, output devices, etc.

A Policy proxy 1300 is positioned in the communication path between mobile device 1100 and applications server 1200 such that it is enabled to receive, block, intercept, substitute, monitor or alter communications between the applications server 1200 and the mobile device 1100. Policy proxy 1300 can be supplied with one or more policies, or policy elements, from policy server 1400, and can use these policies to permit, limit or prevent the mobile device's 1100 access to the server 1200, to configure the mobile device's 1100 security policy configuration, and for other uses as required.

Policy proxy 1300 is also enabled to determine the current policy settings of mobile device 1100. In this simplified architectural rendering of an embodiment of a policy proxy system, the policy proxy 1300 receives requests for communication from a mobile device 1100 or from an applications server 1200 in the form of an information and/or policy transport represented by communication path 1500/1550. The information and/or policy transport 1500/1550 can be any type of information and/or policy transport such as the Exchange ActiveSync™ protocol, Network File System (NFS) protocol, Interactive Mail Access Protocol (IMAP), or other such protocol.

Figure 2:
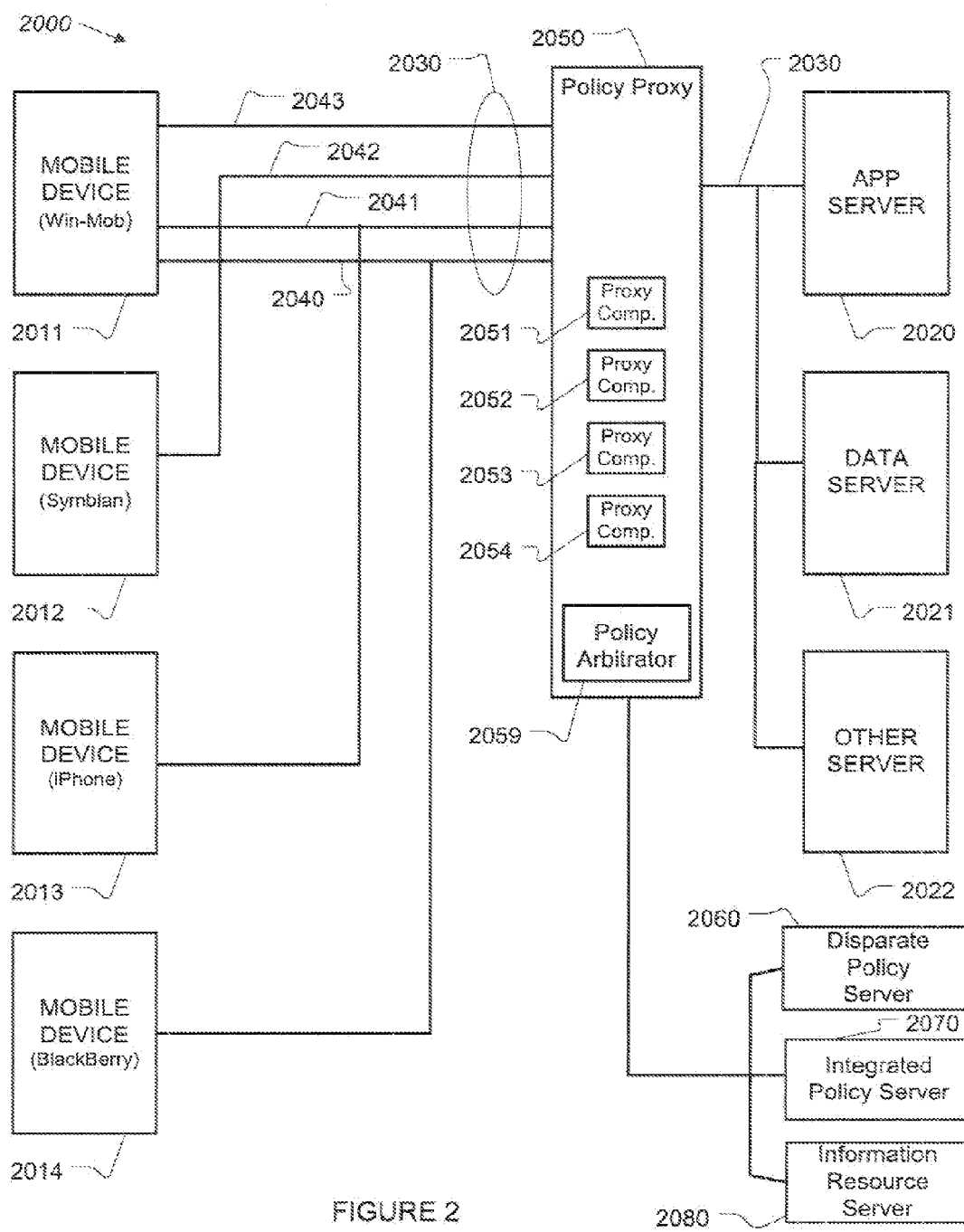
FIG. 2 illustrates an exemplary non-limiting architecture of a policy proxy system.

FIG. 2 illustrates an architectural rendering of a typical heterogeneous exemplary illustrative non-limiting policy management system. System 2000 comprises one or more mobile devices 2011, 2012, 2013, and 2014. Typically, these devices are developed by one or more handset manufacturers and sold for use with wireless service plans sold by various providers, but may also, or instead, be capable of connecting using other methods, such as WiFi, Bluetooth, or wired connections. For exemplary purposes, device 2011 is a Windows Mobile™-based device, mobile device 2012 is a Symbian-based device, device 2013 is an iPhone™, and mobile device 2014 is a BlackBerry™ device. These devices are operably linked to various types of servers 2020, 2021, and 2022 over a wired and/or wireless network 2030 using one or more information and/or policy transport protocols 2040, 2041, 2042, and 2043 (collectively "policy transport protocols") intermediated by a policy proxy 2050. Applications servers 2020-2022 may include, for example, a Microsoft™ Exchange Server, a BlackBerry™ Enterprise Server, a CalDav™ server, an e-mail server (e.g. an SMTP, IMAP, POP, or other e-mail server), a web (i.e. HTTP/HTTPS) server, a Calendar, Task, Contacts, or other PIM data source, a network file server, and/or other server useful to a mobile device. For the purpose of the example system of FIG. 2, applications server 2020 represents a Microsoft™ Exchange Server, applications server 2021 represents a network database server, and applications server 2022 represents a proprietary network server.

Information and/or policy transport protocols 2040-2043 may include, for example, EAS 2043, BPS 2040, OMA 2042, and HTTP/HTTPS or e-mail used to transport Apple™ Configuration Profiles 2041. Other transport or data access protocols can be supported as well, such as Network File System (NFS) (not shown).

One or more of the policy transport protocols 2040-2043 are routed through a policy proxy 2050, which comprises one or more transport protocol-specific proxy components 2051, 2052, 2053, & 2054, and a policy arbitrator 2059. A policy proxy is sometimes referred to as a "mobile services proxy". The transport protocol-specific proxy components can include, for example, an EAS proxy component 2051, a BPS proxy component 2052, an OMA proxy component 2053, an iPhone™ Configuration Profile proxy component 2054, or other proxy components configured for specific policy transport protocols as may be, or have been, developed by those skilled in the art.

A plurality of policy proxy 2050 instances can be used to increase throughput or to segregate transport protocol traffic. The functions of one or more transport-specific proxy components and the policy arbitrator can be integrated into a single installation, or may be divided across two or more computer systems in communication to effect the functions of the policy proxy. The policy proxy and its various components are connected using a network to one or more disparate policy servers 2060, policy integration servers 2070 and/or additional information resource servers 2080 that provide it with policy, authorization and authentication, or other information.

Disparate policy servers 2060 as described herein are those systems which provide policy and/or report policy configuration status for a particular type of mobile device. Disparate policy servers include, for example, Microsoft™ Exchange, BlackBerry™ Enterprise Server (BES), and Trust Digital™ Server. An integrated policy server 2070 as described herein provides the capability to define common policies and apply them to a plurality of device types.

Information resource servers 2080 may include authentication and authorization servers such as Kerberos, LDAP or Active Directory, calendar and messaging servers, such as those provided by Microsoft™ products like Sharepoint™ and Exchange, calendar servers such as those provided using an industry standard protocol such as iCal™ (e.g. Apple™ Calendar server), and the like.

1.1.7 Policy Proxy (2050)

A policy proxy 2050 is a component that typically operates at the enterprise network boundary and intercepts, processes, and forwards policy transport and data communications between mobile devices 2011-2014 and applications servers 2020-2022. Processing performed by policy proxies 2050 can comprise injection of common policy-derived policy elements or commands into policy transport exchanges between the enterprise applications servers 2020-2022 and mobile devices 2011-2014. A policy proxy 2050 can also receive and/or intercept data transport communications between mobile devices 2011-2014 and applications servers 2020-2022. Such interception and processing can be done to determine whether a mobile device 2011-2014 is in compliance with required policies, to bring a mobile device 2011-2014 into compliance with required policies, to block mobile device 2011-2014 access to applications network resources, such as servers 2020-2022, when the mobile device 2011-2014 is not in compliance with required policies, to assure an applications server 2020-2022 that a mobile device is in compliance with required policies, to translate policy elements or commands into forms compatible with a mobile device 2011-2014 or applications server 2020-2022, to insert, alter or remove data elements or commands in data transport communications, or for other purposes such as logging or statistical information gathering. Methods of establishing proxy components in networks, and the general functionality needed to intercept and perform processing on data streams passing through proxies is well understood by those with skill in the art. The technology herein extends the known concepts of network proxies so as to provide the policy-related functionality described herein. A policy proxy 2050 can be implemented in a plurality of ways, such as in a component of a firewall, as a stand-alone device, or as a service on a network.

The policy proxy 2050 can function as a proxy service for one or more policy transports 2040-2043, in which the policy proxy 2050 receives data packets comprising policy transport communications from both the mobile device 2011-2014 and from applications servers 2020-2022, deconstructs the policy transport protocol, adds, changes, or deletes device policy elements inconsistent with the policy specifications assigned for the specific device, and inserts or changes policy elements so as to implement the common policy for the device, and finally, reassembles the policy transport communications for delivery to the mobile device 2011-2014 (and subsequent implementation of the policy, if desired). Policy proxies can also receive, modify, add, suppress, or deliver data packets comprising exchanges other than policy transport communications, such as data communications when enforcing policy limitations or data deletion requirements on a mobile device, or when acting as a firewall, or to prevent communication between non-compliant mobile devices and enterprise servers.

In some exemplary embodiments, a policy proxy 2050 can function as a policy compliance checking system, wherein the policy proxy 2050 uses one or more policy transports 2040-2043 to determine whether a mobile device 2011-2014 is in compliance with required policies. When a mobile device 2011-2014 is determined to be in compliance with required policies, the policy proxy 2050 permits communication between the mobile device 2011-2014 and applications servers 2020-2022. When a mobile device 2011-2014 is determined to be out of compliance with required policies, the policy proxy 2050 can, in some exemplary embodiments, cause the mobile device 2011-2014 to be brought into compliance, or blocked from access to server 2020-2022. When required by policy the policy proxy 2050 can cause the mobile device 2011-2014 to fully or partially delete data stored locally in the mobile device 2011-2014 though insertion, deletion, or modification of data elements and/or commands in the communication data stream between the policy proxy 2050 and the mobile device 2011-2014.

In some exemplary embodiments, the policy proxy 2050 acts as a firewall to prevent mobile device 2011-2014 communications from reaching applications servers 2020-2022 until the mobile device 2011-2014 has implemented the common policy assigned to it and demonstrated compliance with the common policy through interactions with the policy proxy 2050. In such exemplary embodiments, the policy proxy 2050 is configured to act as a policy transport, at least to the extent required to implement this functionality, for the device types supported. In some exemplary embodiments the policy proxy 2050 can cause the mobile device 2011-2014 configuration, and/or the configuration of various information servers 2080 and other network components, such as servers 2020-2022, to be altered so as to block access to the network by the mobile device 2011-2014, when required by policy. Mobile device configuration changes involved in this process can include, but are not limited to, deletion of policy settings, deletion of passwords, deletion of required software, deletion of application data (e.g. mail account settings, server addresses, etc.), resetting the device to factory default settings, removal of mobile device 2011-2014 identification data from authorization or authentication server, or other changes as will be well understood by those with skill in the art.

In some exemplary embodiments the policy proxy 2050 comprises one or more transport protocol-specific proxy components 2051-2054 useful to implement device-specific aspects of the functionality of the policy proxy 2050.

In some exemplary embodiments, a policy proxy 2050 can provide one or more of the following services:

Policy compliance checker for the mobile device. The policy proxy 2050 can function as a policy compliance checker, where the current state of a mobile device's 2011-2014 policy compliance is determined through interaction between the policy proxy 2050 and the mobile device 2011-2014 using one or more policy transports 2040-2043. The results of such checks can form the basis for blocking access to applications servers 2020-2022, for injecting policy elements into the mobile device 2011-2014 to bring it closer to compliance with required policy, or for other purposes.

Policy injector to the mobile device. The policy proxy 2050 can function as a policy injector, where third party policy elements, such as policy elements derived from a common policy, can be injected into a policy transport communication stream 2040-2043 between an applications server 2020-2022 and a mobile device 2011-2014. These injected policy elements may augment and/or replace portions of the policy transport communication stream. In some exemplary embodiments policy elements can also be removed from policy transport communication streams. Policy injection can be done at the request of the mobile device 2011-2014, as a result of a mobile device 2011-2014 being found to be out of compliance with required policies during a compliance check, or for other reasons, such as administrator command, periodic scheduling of such injection, or for other reasons.

Policy results interceptor. The policy proxy 2050 can also function as a policy results interceptor, in which policy and configuration results are intercepted in transit from a mobile device to an applications server, and the stream of policy and/or configuration results are redirected to additional and/or alternative applications servers and/or policy servers.

Policy results injector to the applications server. The policy proxy 2050 can also function as a policy results injector to an applications server 2020-2022 by formulating responses to applications server 2020-2022 policy status queries or other policy transport communications and using them to respond to the applications server 2020-2022. This capability can be used to satisfy an applications server 2020-2022 that a mobile device 2011-2014 is in compliance with its required policies, whether the mobile device 2011-2014 is actually in compliance or not, or to cause the applications server 2020-2022 to specify the policy it expects the mobile device 2011-2014 to be in compliance with. The former capability is useful when an applications server 2020-2022 is requiring compliance with a policy that is less strict than a common policy applicable to the mobile device 2011-2014, when an applications server 2020-2022 is requiring a policy that is more restrictive than a common policy applicable to a mobile device 2011-2014, when an applications server 2020-2022 is not configured to interoperate with the particular mobile device 2011-2014, or for other purposes as will be apparent to those with skill in the art. The later capability is useful for enabling the policy proxy 2050 to collect legacy policy server policy elements for integration into common policies or for other purposes.

Application firewall. The policy proxy 2050 can function as an application-aware firewall for one or more network transport protocols 2040-2043. The policy proxy 2050 is therefore enabled to intercept all elements of the mobile device 2011-2014 to applications server 2020-2022 communication stream and mediate the operation of the network transport protocol. For example, a policy proxy 2050 may deny communication by policy (e.g., from restricted devices, by network source, or by time-of-day). Alternatively, a policy proxy 2050 may deny particular interactions by policy (e.g., restrict "contacts" synchronization but permit e-mail synchronization). In addition, a policy proxy 2050 may ensure that commands and data in the session are properly formed, to prevent the backend applications servers 2020-2022 from acting on requests that may cause unpredictable behavior.

Application information routing and mediation. Policy proxy 2050 may function to provide rule-based synchronization of other information sources 2080 and to provide synchronization between these sources and a mobile device 2011-2014 under the instruction of one or more policy-based rules. A policy proxy 2050 can synchronize the mobile device 2011-2014 with third party e-mail or PIM information. For example, "contacts" from a Customer Relations Management (CRM) system could be shared with specific mobile devices. Alternatively, alerts may be injected as e-mails.

Policy-required data deletion of data on the mobile device 2011-2014. Policy proxy 2050 can, when required, insert, remove or modify policy or data elements or commands in the communication between the mobile device 2011-2014 and the policy proxy 2050 so as to cause the mobile device 2011-2014 to delete some or all of its locally stored data. Such data can comprise e-mails, data files, policy settings, or application data, such as PIM memos, contact lists, etc. Any data that can be removed from the mobile device 2011-2014 as a result of synchronization with a server, or by a command or other instruction from a server, can be removed by the policy proxy 2050. In some cases, such as a full device reset command, this can include all user data on the device that was not part of the default factory installation settings.

A policy proxy enables mobile devices to synchronize business information (e.g. E-mail and PIM information) with a variety of additional information resource servers (e.g., Lotus Notes™, Microsoft Hotmail™, and Google gmail™), without specialized software on the mobile device. In one aspect, the synchronization occurs transparently without the mobile device being aware of the source and/or destination of the information being synchronized. In a second instance, a policy proxy can combine information from a plurality of information resource servers into a single content stream for synchronization with the mobile device, and split the information stream from the device to its respective information resource servers. This is useful when the server provides the system of record with a specific type of information, for example, business contacts in a CRM system, internal company contacts in a company directory, and the like. Similar types of information handling are available for each type of PIM data, such as tasks, calendar entries, contact records, e-mail, documents, and the like.

Policy proxies make use of rules for various aspects of their functioning, such as the rule-based synchronization described above, and the delivery rules described below. The term "rules", as used herein, refers to any method of describing the relationship between specific data inputs and an action or other behavior on the part of a policy proxy. For example, a rule can specify that a mobile device that possesses digital certificate A is to be permitted to access a given enterprise network, and that a mobile device that does not possess digital certificate A is not permitted to access a given enterprise network. Rules can encode a wide range of information in ways that are useful to implement such things as common policy specification translation into policy transport compatible forms, policy transport to device type compatibility, and common policy specifications. In some exemplary embodiments rules are specified in the form of XML documents, with one or more rules being described by the XML document(s). For example, a document that describes a common policy specification comprising three rules can be structured as follows:

```
<common_policy>
    <min_password_len> 8 </min_password_len>
    <auto_dev_lock> yes </auto_dev_lock>
    <dev_lock_delay> 600 seconds</dev_lock_delay>
</common_policy>
```

Other exemplary embodiments specify rules using other mechanisms, such as table lookups, associative arrays, hashes, comma-delimited lists, name-value pairs, tagged data, predefined value sequences, or any other method as will be understood by those having skill in the art.

Returning to FIG. 2, the policy proxy 2050 operates as follows when a policy has been identified for sending to a mobile device 2011-2014. The policy proxy 2050 receives the policy to be sent and an identification of the mobile device the policy is applicable to. The Policy Arbitrator 2059 component decomposes the policy into its constituent policy elements, maps these policy elements against the policy compliance capabilities of the device, identifies applicable and available policy transports, transforms policy elements to one or more device-specific policy elements appropriate to the mobile device to ensure that all policy elements in the policy are compatible with the mobile device's policy compliance capabilities, maps the resulting policy elements against the policy elements that the applicable and available policy transports can transport to and install on the mobile device, groups policy elements by the identified policy transports, and causes the policy to be transported to the specified mobile device(s) and installed on the device(s). In some exemplary embodiments, the grouping of policy elements by the identified policy transports is done in a manner that minimizes the number of policy transports that are needed to transport the policy to the mobile device(s).

In typical usage of an exemplary embodiment, a mobile device 2011-2014 initiates a connection to an applications server 2020-2022 or other server 2080 using a network transport protocol capability of the mobile device 2011-2014. The network transport protocol is routed through the policy proxy 2050, which identifies the mobile device and the protocol being used. If the policy proxy 2050 and/or network transport protocol-specific proxy components 2051-2054 determine that access is permitted, the policy proxy 2050 forwards the network transport protocol to the requested destination server 2020-2022 or 2080, and routes return data to the mobile device from the server 2020-2022 or 2080. If access is not permitted, the policy proxy 2050 acts according to the requirements of policy. Actions may be blocking access, requiring changes to the mobile device's 2011-2014 configuration, partially or fully wiping data stored locally in the mobile device 2011-2014, or other actions.

It is sometimes not possible to manage all of the desired policy and data elements using a single policy transport. In this case, the policy arbitrator 2059 selects groups of policy and data elements and allocates them to different policy or data transports. For example, policy settings for a mobile device 2011-2014 would be sent using a policy transport, such as EAS, while data commands to update local copies of data files are sent using the NFS protocol, and commands to delete locally cached mail folders are sent using IMAP protocols.

The policy arbitrator 2059 may provide mapping and translation services between policy elements in policies supplied by policy servers, and the policy elements used with a particular mobile device and selected available policy transports. The mapping process between policy elements of a policy and policy elements compatible with a mobile device can involve a one-to-one mapping of the policy element to a device configuration setting, a translation of the policy element to a device specific setting (e.g. mapping the policy element value of "Yes" to a binary value of 1 in the device setting), provide a many-to-many mapping, where one or more policy elements are mapped to one or more device settings (with optional translation of values as appropriate), and/or the creation of additional and/or new device configuration settings as necessary. In other implementations, policy elements may not be mapped to a device configuration setting.

EAS Proxy Component

One exemplary embodiment of the transport protocol-specific proxy component described above is an EAS Proxy Component. EAS Proxy Components intercept and manipulate the EAS protocol between a Microsoft™ Exchange Server and a mobile device. It can be deployed as a network appliance, as part of a firewall, as part of a policy proxy, as a service on an Internet Authentication Service (IAS) server, or using other techniques well understood by those skilled in the art.

An EAS Proxy Component, in combination with a policy proxy, allows a management system other than Microsoft™ Exchange to observe, filter, and modify the contents of the EAS protocol stream, as well as injecting new commands into the stream and capturing the results. This provides the enterprise with a richer device management system than Microsoft™ Exchange natively provides. The EAS Proxy Component allows other servers, in addition to the Microsoft™ Exchange Server, to participate in EAS Handshake, E-mail and/or PIM Synchronization, and policy processing.

Figure 3:
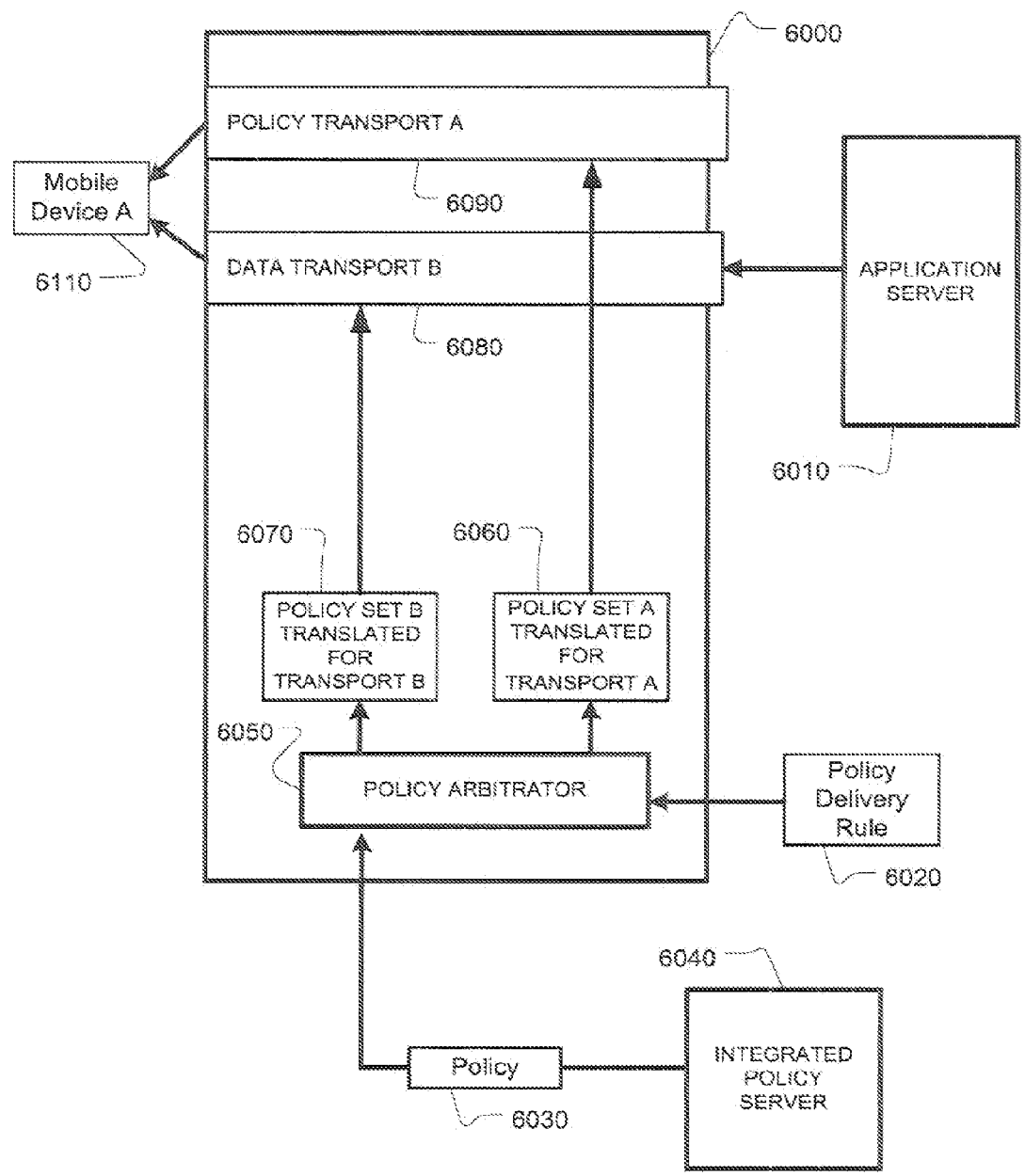
FIG. 3 is an exemplary illustrative non-limiting policy proxy flow diagram.

FIG. 3 illustrates a simplified example of the operation of a policy proxy. In this example, policy proxy 6000 intermediates the connection using policy transport A and data transport B between mobile device A 6110, and an applications server 6010. The policy proxy comprises two transport components, one for the policy transport A 6090 and one for the data transport B 6080, for example, such as an EAS Proxy Component for the policy transport A and an IMAP data component for the data component B. The policy proxy further comprises a policy arbitrator 6050 as described above.

The policy proxy 6000 is configured with one or more policy delivery rules 6020, which specify which configuration settings may be set and managed by each particular policy or data transport for each particular device type. These rules are used by the policy arbitrator 6050 to process policy 6030 from the integrated policy server 6040, and to split the policy into disparate policy sets A 6060 and B 6070. These policy sets are delivered to the policy proxy transports 6080 and 6090 respectively for use in carrying out policy requirements by delivering policy to a mobile device 6110 using a policy transport 6090, or for carrying out policy requirements by delivering, adding to, removing from, or modifying data passing through a data transport 6080. For example, if the policy requirements of a policy set 6060 comprise deletion of locally stored corporate e-mail from a mobile device 6110, the policy arbitrator 6050 will generate, using device-appropriate proxy translation components (not shown), the required commands and data into a policy set 6070 for the data transport 6080 to implement by inserting commands and/or data, removing commands and/or data, and/or altering commands and/or data in the data stream being carried through the data transport 6080 so as to cause the mobile device 6110 to delete the required e-mail from its local storage.

1.1.8 Exemplary Non-Limiting Policy Intermediation

The interception, possible alteration of and forwarding of modified data streams so as to implement policy requirements through use of extant software on mobile devices and/or servers is referred to herein as "policy intermediation".

There are two ways to implement policy intermediation: active and passive. Passive intermediation involves the interception of protocol requests and provision of "empty" results sets which are then used to synchronize with the policy-managed device. Active intermediation occurs when protocol requests are intercepted, transformed, and actions other than those resulting from provision of an "empty" results set are performed.

Passive intermediation can be used to block access to servers, by preventing server-supplied data from reaching the policy-managed device. Passive intermediation can also, with some protocols such as IMAP, be used to delete data from a policy-managed device by synchronizing it with an empty data set, such as a mail folder that contains no messages.

Active intermediation can be used to block access to servers by preventing requests from reaching servers, by modifying requests in various ways (e.g. removal of authorizations, alteration of request commands, redirection of responses, etc.) so as to prevent return of data to the requesting device. Active intermediation can also, with some protocols such as NFS, be used to delete data from a policy-managed device by altering communication data streams to incorporate commands to delete files, alter the content of files, activate applications to alter stored data, etc.

With some protocols, such as IMAP, both passive and active intermediation are useful, depending on the policy requirement to be implemented. For example, simply replacing data in a synchronization operation with empty results sets can result in deletion of all data so synchronized. However, this does not affect other data on the policy-managed device that is not synchronized at the request of the policy-managed device. By using active intermediation, commands notifying the policy-managed device of the need to synchronize yet other data can result in requests to synchronized said other data, enabling the use of passive intermediation to delete said other data from the policy-managed device.

For example, a policy-managed mobile phone is connected to an enterprise mail server using ActiveSync. Device policy calls for unauthorized devices (e.g. those missing a valid device authorization certificate) to be wiped of enterprise information. In this example, the policy-managed device connects and is found to have an invalid certificate. Instead of denying access to the enterprise mail server, a policy-managed intermediation occurs, and causes the e-mail, tasks, calendars, and other synchronized items to be removed from the policy-managed device. The policy-managed device thus can be wiped, either in whole, or in part, using these techniques. This is accomplished by altering the e-mail synchronization results from the enterprise mail server and causing the policy-managed device to synchronize instead with an empty mailbox. Alternatively, a more active approach may be used, such as notifying the policy-managed device that there have been changes in folders containing enterprise e-mail, causing it to request synchronization of those folders. These alternative approaches are described in more detail below. These techniques effectively wipe the enterprise e-mail and other information from the policy-managed device.

Similar techniques in which the desired results sets are replaced with an empty set, and the empty set is then synchronized to a policy-managed device, or where additional data commands are injected, are applicable for other protocols, such as HTML5, Calendars using iCal or CalDav, Tasks using iCal or CalDav feeds, Contacts, files using WebDav or NFS, and other protocols such as stsdev (e.g. SharePoint). Other enterprise data, such as that provided by CRM systems such as Salesforce or SugarCRM, can be similarly intermediated and managed by intercepting and intermediating requests.

Figure 4:
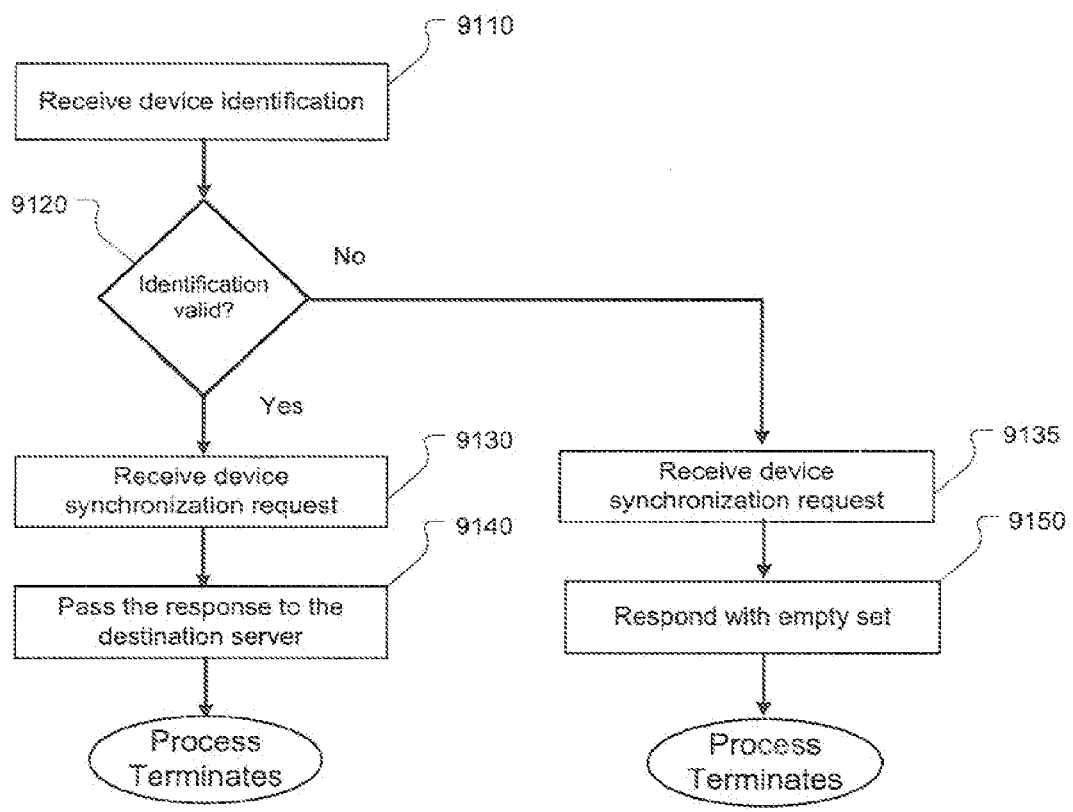
FIG. 4 is a flow chart of an exemplary illustrative non-limiting procedure for handling a device synchronization request by returning an empty results set if a device does not have a valid ID.

The steps of the process as dealt with in an exemplary embodiment are shown in FIG. 4. A policy proxy intercepts or requests a device identification 9110 and determines whether the device identification is valid 9120. If it is, then processing proceeds as requested, with a device synchronization request (e.g. IMAP folder update, NFS cache update, etc.) 9130 reception resulting in the request being forwarded to the destination server 9140, and the process completes. Other requests will be similarly forwarded during the connection session if the device identification remains valid. If the device identification is not valid 9120 when a device synchronization request is received 9135, the policy proxy responds with an empty set to the synchronization request (9150) and the process is complete. If the device identification remains invalid, future requests will also be responded to with an empty set in this exemplary embodiment.

Figure 5:
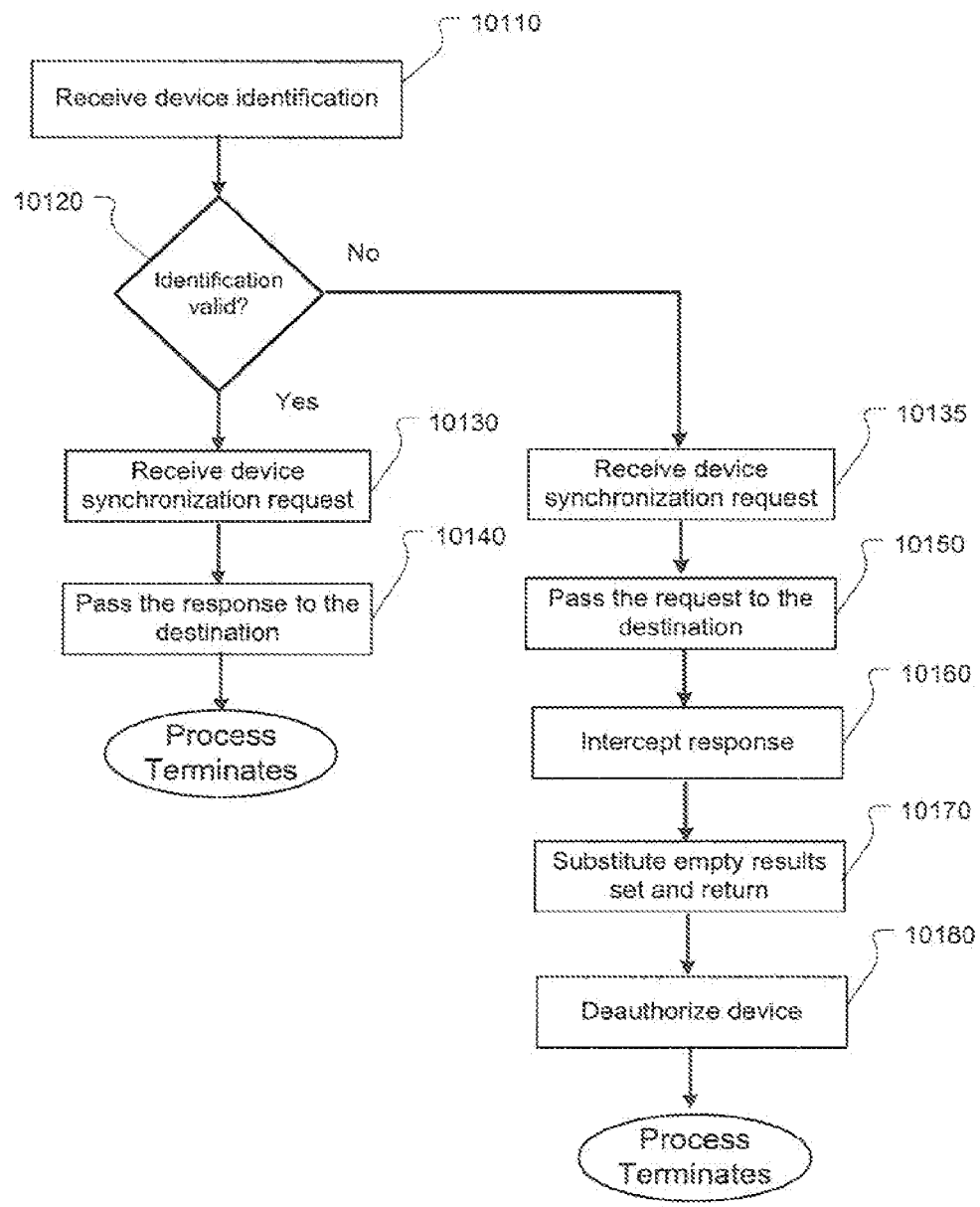
FIG. 5 is a flowchart of an alternative exemplary illustrative non-limiting procedure for handling a device synchronization request by intercepting a server response and substituting an empty results set if a device does not have a valid ID.

An alternate process as dealt with in an alternate exemplary embodiment is shown in FIG. 5. As above, a policy proxy receives a device identification 10110 and determines whether the device identification is valid 10120. If the device identification was valid 10120 then when the policy proxy receives a device synchronization request (e.g. IMAP folder update, NDF cache update, etc.) 10130 the response is passed through to the destination 10140 and the process is complete. If the device identification was not valid, then when a device synchronization request is received 10135, the request is passed through to the destination server 10150, but the response is intercepted 10160 and the results are removed and an empty results set substituted and returned 10170. In addition, the device is deauthorized (if not previously deauthorized) 10180, after which the process is complete.

Figure 6:
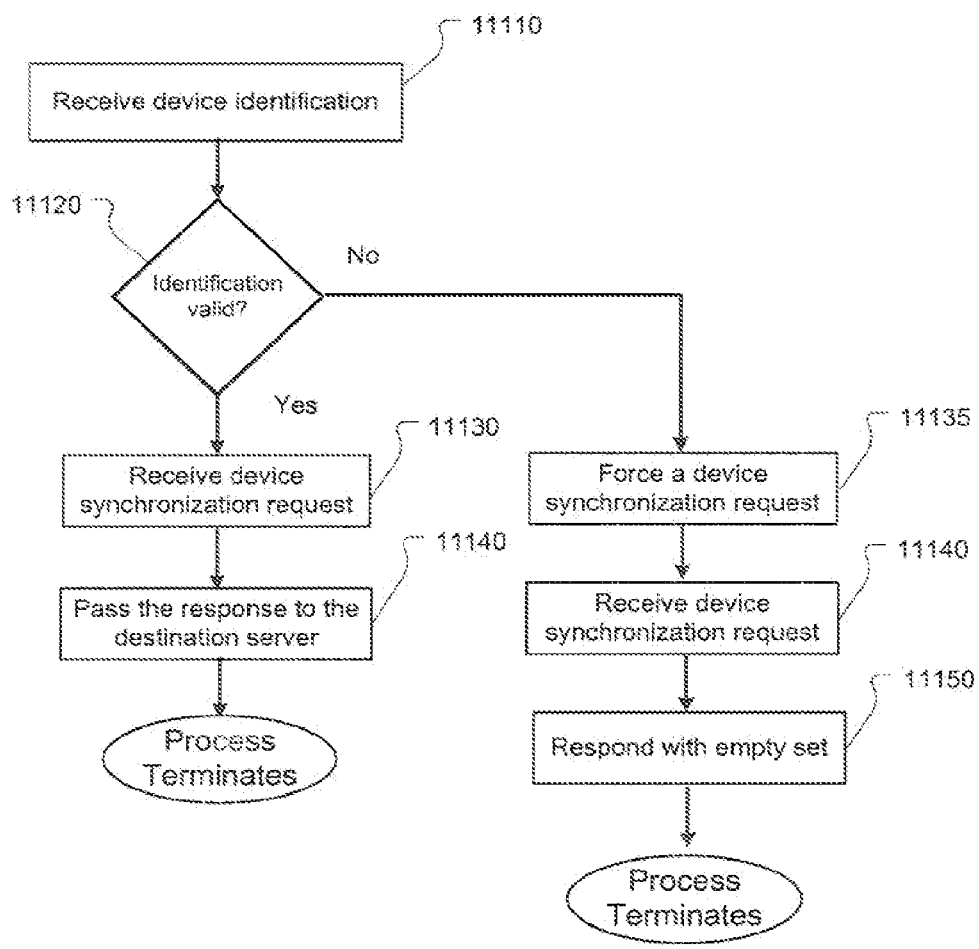
FIG. 6 is a flowchart of an exemplary illustrative non-limiting procedure for forcing a device synchronization request with an empty set response to the synchronization request.

Yet another alternate process as dealt with in yet another alternate exemplary embodiment is shown in FIG. 6. As above, a policy proxy receives a device identification 11110 and determines if the device identification is valid 11120. When the policy proxy then receives a device synchronization request (e.g. IMAP folder update, NFS cache update, etc.) 11130, if the device identification was valid, the response is passed through to the destination 11140. Otherwise, if the device identification was not valid, the device is forced to make a device synchronization request 11135. When the policy proxy receives the device synchronization request 11140 it responds with an empty results set 11150 and the process is complete.

Figure 7:
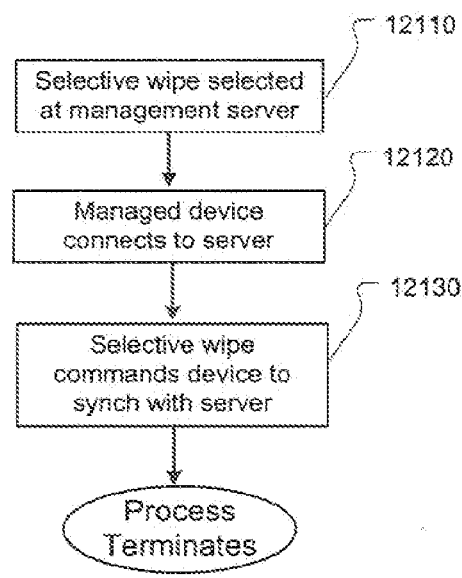
FIG. 7 is a flowchart of an exemplary procedure for performing a selective wipe of a device.

Still another alternate process as dealt with in still another alternate exemplary illustrative non-limiting embodiment is shown in FIG. 7. A device selective wipe function is activated at the management server for a device 12110. The next time the managed device connects 12120, the selective wipe is implemented by commanding the device to synchronize its data with the server 12130. The synchronization results in the data on the device being deleted according to processes described above.

Figure 8:
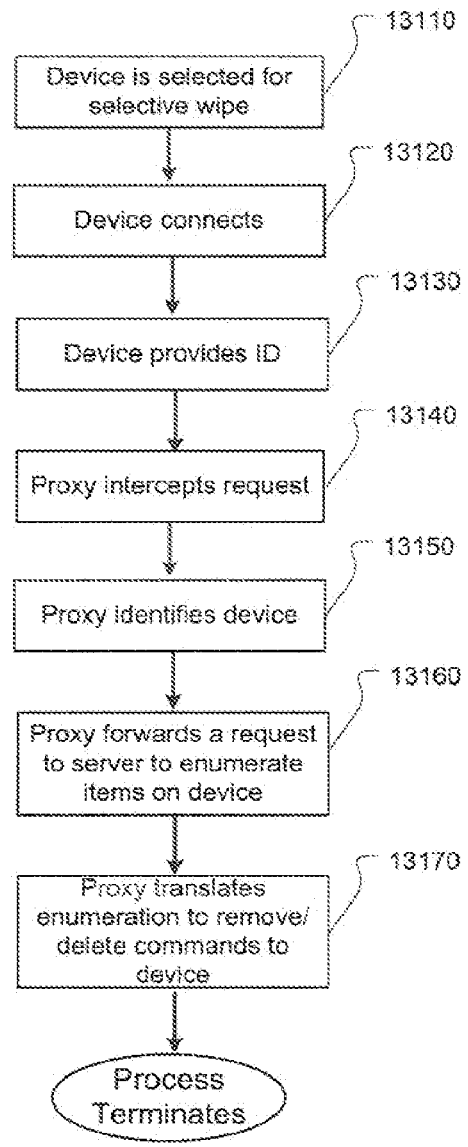
FIG. 8 is a flowchart of an alternate exemplary procedure for performing a selective wipe of a device.

Another alternate process supported by some exemplary embodiments is shown in FIG. 8. A device selective wipe function is activated at the management server for a device 13110. When the device connects 13120, it provides its device ID 13130. The policy proxy intercepts the request 13140, identifies the device 13150, forwards a request to at least one server for the at least one server to enumerate the items of interest that are, or may be, stored on the device 13160, and the policy proxy translates the enumeration into a set of remove/delete commands appropriate to the device 13170. These commands are then sent to the device where they result in the deletion of the enumerated items. For example, a device connects using the IMAP protocol. The policy proxy intercepts the connection, and requests a list of the mail folders associated with the device from the IMAP server. The policy proxy then requests the device to delete each of the folders identified by the IMAP server. The deletion request can be executed using passive or active intermediation, as appropriate to the specific device type and its software and the functions required to carry out the data removal.

1.1.9 Selective Wipe Example

An exemplary illustrative non-limiting implementation can perform a selective wipe of enterprise-related e-mail folders on a mobile device that accesses enterprise e-mail by way of the EAS protocol to a Microsoft Exchange server using a combination of active and passive intermediation methods. Other e-mail folders on the mobile device are not affected. Non-enterprise data on the mobile device are not affected by this process. Only the corporate e-mail folders have had their contents removed from the mobile device when the process is complete. Since EAS and Exchange manage synchronization of PIM data, such as calendars, contact lists and task lists, as if they were e-mail folders, this data can be selectively wiped using the same method shown here for e-mail. A state diagram for an exemplary policy proxy engaged in this activity is shown in FIG. 9.

Figure 9:
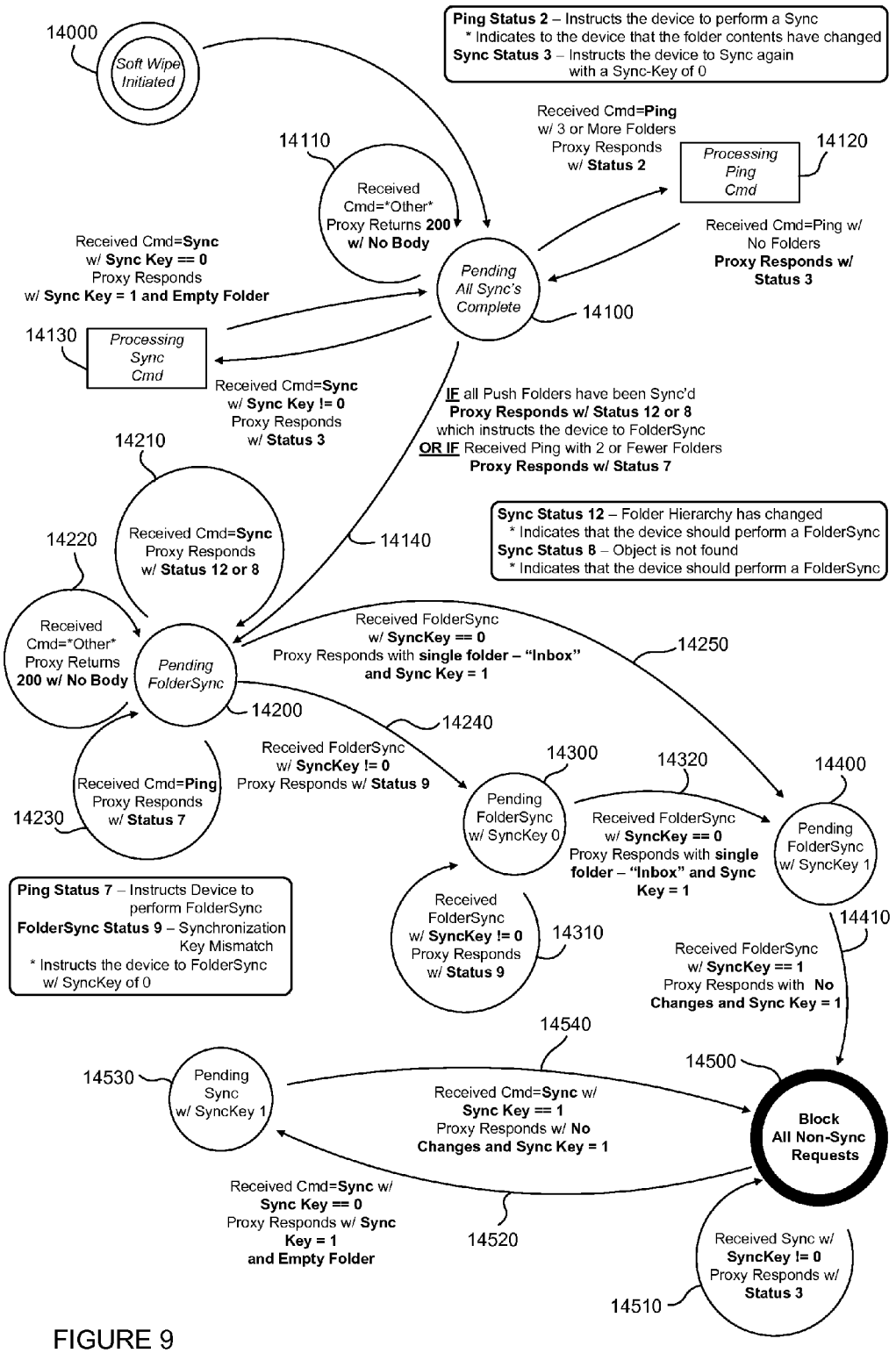
FIG. 9 is a state transition diagram of exemplary illustrative non-limiting internal states of an exemplary policy proxy performing a selective wipe of a device.

Referring to FIG. 9, the process begins when a selective (or "soft") wipe of the e-mail folders is initiated 14000. The initiation of the selective wipe can occur as a result of a policy rule, at the request of a human using a device management user interface, by software systems other than policy servers, or by other means as will be known to those with skill in the art. The exemplary selective wipe request specifies the target device to be wiped, and that all enterprise e-mail folders are to be deleted from the target device, or have their contents deleted. In some exemplary embodiments a selective wipe can be specified to delete only a subset of the enterprise e-mail folders from the target device. The policy proxy enters the "Pending All Syncs Complete" state 14100 until the target device connects and sends a command.

When the target device connects it will send a ping command, to request monitoring of changes to one or more folders, a sync command to request updating of one or more folders, or some other command. The policy proxy will intercept any command sent and respond based on its current state and the particular command intercepted.

If the command is not a ping or sync 14110, the policy proxy will return a response with an HTTP status of 200 (i.e. "OK") with no message body. This response reveals nothing to the client, but does not result in any errors.

If the command is a sync with a non-zero sync key 14130, which indicates that the client is attempting to continue a previous session, the policy proxy responds with a status of three, which instructs the device to start a new session by sending a sync command with a sync key of zero. If the command is a sync with a zero sync key 14130, the policy proxy responds with a sync key of one and an empty folder. This response causes the client to synchronize to the empty folder, deleting any prior content it had stored locally on the mobile device for that folder. The synchronized folder has now had its content deleted on the mobile device, but other data on the device remains intact.

If the command is a ping that specifies no folders 14120, the policy proxy responds with a ping status of three, which indicates that the mobile device did not specify all required parameters, and should re-issue the ping command and specify the folders to be monitored. If the command is a ping that specifies three or more folders, the policy proxy responds with a ping status of two and a list of the specified folders. This status indicates that there have been changes in the listed folders, and these should be synchronized. The mobile device then issues sync commands for each listed folder, and the policy proxy then deals with the sync commands as previously described so as to delete the content of these folders. The listed folders are referred to herein as "push folders". These are folders that the mobile device has named explicitly, so these are wiped first when there are three or more of them, for purposes of efficiency.

When all of the push folders have been synchronized with empty folder responses, the policy proxy responds with a status of twelve or eight 14140. Either status will result in the mobile device performing a foldersync command to request an update of its available folder list. Alternately, if there were fewer than three push folders in the mobile device's ping request, the policy proxy responds with a status of seven, which causes the mobile device to perform a foldersync command. In either case, the policy proxy transitions from the Pending All Sync's Complete state 14100 to the Pending Foldersync state 14200.

In the Pending Foldersync state 14200 the policy proxy is waiting for a foldersync command. If it instead receives a sync command 14210, it responds with a sync status of twelve or eight to tell the mobile device to perform a foldersync. If it receives a ping command 14230, the policy proxy responds with a ping status of seven, which also instructs the mobile device to send a foldersync command. If it receives some other command, the policy proxy responds with an HTTP 200 status and no body 14220 to indicate "OK". In each case the policy proxy remains in the Pending Folder Sync state 14200. Only when it receives a foldersync command does the policy proxy change states.

If the foldersync command is received with a non-zero sync key 14240, the policy proxy responds with a status of nine, to tell the mobile device that there has been a synchronization key mismatch and it should reissue the foldersync with a sync key of zero to start a new session. It then enters the Pending FolderSync with Sync Key Zero state 14300. If it receives a foldersynch command with a non-zero sync key, it responds with a status of nine 14310, and remains in the Pending FolderSync with Sync Key Zero state 14300. Only when it receives a foldersync command with a zero sync key 14320 does it respond with a single empty folder called "inbox" and a sync key of one, and then transitions to the Pending Foldersync with Sync Key One state 14400.

If, while in the Pending Foldersync state 14200, the policy proxy receives a foldersync command with a sync key of zero 14250, it responds with a single empty mail folder called "inbox" and a sync key of one, and transitions to the Pending Foldersync with Sync Key One state 14400.

If, while in the Pending Foldersync with Sync Key One state 14400, the policy proxy receives a foldersync command with a sync key of one 14410, it responds with a "No Changes" result and a sync key of one, and then transitions to the Block All Non-Sync Requests state 14500.

While in the Block All Non-Sync Requests stat 14500, the policy proxy will respond to a sync command with a non-zero sync key 14510 with a status of three (indicating "re-issue sync with a sync key of zero", as previously described). When a sync command with a zero sync key is received 14520, the policy proxy responds with an empty folder and a sync key of one and transitions to the Pending Sync with Sync Key One state 14530. The empty folder in the response meanwhile causes the mobile device to delete its local copy of the contents of the synchronized folder.

When the policy proxy then receives a sync command with a sync key of one 14540, it responds with "No Changes" and a sync key of one, and then transitions to the Block All Non-Sync Requests state 14500. Since the mobile device has, at this point in the process, been told to resynchronize its folders, and has an updated list of folders to synchronize, and the Block All Non-Sync Requests 14500 to Pending Sync with Sync Key One 14530 state loop will clear the device-local data for each folder as it is synchronized, the mobile device will complete the process with all enterprise mail folders (or PIM folders that are treated as mail folders) cleared of enterprise data, while other data on the mobile device remains intact. In this way the selective wipe is accomplished in one exemplary embodiment of the invention.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Although the present invention has been described in relation to exemplary illustrative non-limiting implementations thereof, many other variations and modifications and other uses will become apparent to those skilled in the art. It is preferred therefore, that the present invention be limited not by the specific disclosure herein.

The invention claimed is:

1. A method for operating a network comprising:
    intercepting, at a policy proxy implemented on non-transitory computer-readable media, a data stream being exchanged between a data server and the mobile device, wherein the policy proxy is remotely and communicably connected to the mobile device over a communication network, and the data stream comprises a synchronization request and email synchronization results,
    comparing, at the policy proxy, actual policy elements of the mobile device with expected policy elements of the mobile device, wherein the mobile device is not configured to support the expected policy elements; and,
    modifying, at the policy proxy, the data stream in accordance with difference between the actual policy elements and the expected policy elements to bring the mobile device into compliance with the expected policy elements;
    wherein modifying the data stream comprises, when the mobile device requests from the data server to synchronize with a non-empty mailbox or a non-empty folder and the policy proxy determines the mobile device does not have access to the non-empty mailbox or the non-empty folder, modifying the e-mail synchronization results from the data server to cause the mobile device to synchronize with an empty mailbox or an empty folder, respectively, and to cause the deletion of the non-empty mailbox or the non-empty folder of the mobile device respectively.

2. The method of claim 1 wherein the step of modifying the data stream results in altering data stored on the mobile device.

3. A system for operating a network comprising:
    one or more memory elements;
    a processor;
    wherein the one or more memory elements has program instructions stored thereon for providing a policy proxy, when the program instructions are executed by the processor, the policy proxy is configured to:
        intercept a data stream being exchanged between a data server and the mobile device, wherein the policy proxy is remotely and communicably connected to the mobile device over a communication network, and the policy proxy is structured to compare actual policy elements of the mobile device with expected policy elements of the mobile device, wherein the mobile device is not configured to support the expected policy elements, and the data stream comprises a synchronization request and email synchronization results;
        modify the data stream in accordance with difference between the actual policy elements and the expected policy elements to bring the mobile device into compliance with the expected policy elements;
        wherein modifying the data stream comprises, when the mobile device requests from the data server to synchronize with a non-empty mailbox or a non-empty folder and the policy proxy determines the mobile device does not have access to the non-empty mailbox or the non-empty folder, modifying the e-mail synchronization results from the data server to cause the mobile device to synchronize with an empty mailbox or an empty folder, respectively, and to cause the deletion of the non-empty mailbox or the non-empty folder of the mobile device respectively.

4. The system of claim 3 wherein the modified data stream results in altering data previously stored on the mobile device.

5. A computer storage device coupled to a processor, said computer storage device storing computer program instructions that when executed control the processor to perform the following functions:
    intercepting, using a policy proxy, a data stream being exchanged between a data server and the mobile device, wherein the policy proxy is remotely and communicably connected to the mobile device over a communication network, and the data stream comprises a synchronization request and email synchronization results,
    comparing, using the policy proxy, actual policy elements of the mobile device with expected policy elements of the mobile device, wherein the mobile device is not configured to support the expected policy elements;
    modifying, using the policy proxy, the data stream in accordance with difference between the actual policy elements and the expected policy elements to bring the mobile device into compliance with the expected policy elements;
    wherein the function of modifying the data stream comprises, when the mobile device requests from the data server to synchronize with a non-empty mailbox or a non-empty folder and the policy proxy determines the mobile device does not have access to the non-empty mailbox or the non-empty folder, modifying the e-mail synchronization results from the data server to cause the mobile device to synchronize with an empty mailbox or an empty folder, respectively, and to cause the deletion of the non-empty mailbox or the non-empty folder of the mobile device respectively.

6. The method of claim 1, further comprising:
    identifying the mobile device at the policy proxy;
    identifying, at the policy proxy, the expected policy in a policy server applicable to the mobile device.

7. The method of claim 1, further comprising:
    translating, at the policy server, the difference between the actual policy elements and the expected policy elements into actions involving the data stream to implement the expected policy elements.

8. The method of claim 1, wherein modifying the data stream comprises inserting, removing, or substituting data or commands in the data stream.

9. The method of claim 1, wherein modifying the data stream comprises translating the expected policy elements into a form transmittable by the data stream and acceptable to the mobile device.

10. The method of claim 1, wherein modifying the data stream causes the expected policy elements to be enforced upon the mobile device without requiring or using additional software on the mobile device for supporting said expected policy elements.

11. The method of claim 1, wherein the modified data stream results in deletion of at least some of the data previously stored on the mobile device.

12. The system of claim 3, wherein the policy proxy is further configured to:
   translate the difference between the actual policy elements and the expected policy elements into actions involving the data stream to implement the expected policy elements.

13. The system of claim 3, wherein modifying the data stream comprises translating the expected policy elements into a form transmittable by the data stream.

14. The system of claim 3, wherein modifying the data stream causes the expected policy elements to be enforced upon the mobile device without requiring or using additional software on the mobile device for supporting said expected policy elements.

15. The system of claim 3, wherein the modified data stream results in deletion of at least some of the data stored on the mobile device.

16. The computer storage device of claim 5, wherein the functions further comprises:
   translating the difference between the actual policy elements and the expected policy elements into actions involving the data stream to implement the expected policy elements.

17. The computer storage device of claim 5, wherein modifying the data stream causes the expected policy elements to be enforced upon the mobile device without requiring or using additional software on the mobile device for supporting said expected policy elements.

* * * * *